US007606503B2

(12) United States Patent
Ikushima et al.

(10) Patent No.: US 7,606,503 B2
(45) Date of Patent: Oct. 20, 2009

(54) PULSE SIGNAL DEMODULATION DEVICE

(75) Inventors: Tsuyoshi Ikushima, Nara (JP); Masaru Fuse, Osaka (JP)

(73) Assignee: Panasonic Corporation, Osaka (JP)

( * ) Notice: Subject to any disclaimer, the term of this patent is extended or adjusted under 35 U.S.C. 154(b) by 647 days.

(21) Appl. No.: 10/585,208

(22) PCT Filed: Jul. 4, 2005

(86) PCT No.: PCT/JP2005/012348

§ 371 (c)(1),
(2), (4) Date: Jul. 3, 2006

(87) PCT Pub. No.: WO2006/013692

PCT Pub. Date: Feb. 9, 2006

(65) Prior Publication Data

US 2009/0175631 A1 Jul. 9, 2009

(30) Foreign Application Priority Data

Aug. 5, 2004 (JP) ............................. 2004-229529

(51) Int. Cl.
*H04B 10/06* (2006.01)
*H04B 10/00* (2006.01)

(52) U.S. Cl. ..................... 398/210; 398/208; 398/154; 398/158

(58) Field of Classification Search ................. 398/202, 398/208, 210, 214, 140, 141, 154, 158
See application file for complete search history.

(56) References Cited

U.S. PATENT DOCUMENTS 5,687,169 A    11/1997   Fullerton (Continued)

FOREIGN PATENT DOCUMENTS

JP          11-504480          4/1998

(Continued)

OTHER PUBLICATIONS

Vincenzo Lottici et al., "Channel Estimation for Ultra-Wideband Communications", IEEE Journal on Selected Areas in Communications, vol. 20, Issue 9, Dec. 2002, pp. 1638-1645.

(Continued)

*Primary Examiner*—M. R. Sedighian
(74) *Attorney, Agent, or Firm*—Wenderoth, Lind & Ponack, L.L.P.

(57) ABSTRACT

In an optical transmission system in which a pulse signal is converted into an optical signal before transmission, a pulse signal demodulation device capable of correctly demodulating the pulse signal is provided. An optical-to-electrical conversion section (31) converts a received optical signal into an electrical signal, and outputs the electrical signal as a received signal. A reception waveform information calculating section (33) outputs, as reception waveform information, information about a shape of a waveform of a short-pulse signal on which a distortion occurring during the time when a short-pulse signal is converted into an optical signal to when the optical signal is converted into a received signal by the optical-to-electrical conversion section (31), is reflected. A template signal generating section (34) generates a template signal which has a waveform on which a distortion similar to a distortion occurring in the received signal is reflected and is in synchronization with the received signal, based on the reception waveform information and a synchronization signal which is in synchronization with the received signal. A correlation section (32) obtains a correlation between waveforms of the received signal converted by the optical-to-electrical conversion section and the template signal to demodulate the pulse signal.

6 Claims, 14 Drawing Sheets

U.S. PATENT DOCUMENTS

| | | | |
|---|---|---|---|
| 5,832,035 A | 11/1998 | Fullerton | |
| 6,549,567 B1 | 4/2003 | Fullerton | |
| 6,928,246 B2 * | 8/2005 | Fuse | 398/79 |
| 7,085,501 B1 * | 8/2006 | Rickard et al. | 398/202 |
| 7,460,793 B2 * | 12/2008 | Taylor | 398/208 |
| 2003/0189975 A1 | 10/2003 | Fullerton | |

FOREIGN PATENT DOCUMENTS

| | | |
|---|---|---|
| JP | 2004-350284 | 12/2004 |

OTHER PUBLICATIONS

Zhengdao Wang et al., "Ultra Wide-Band Communications With Blind Channel Estimation Based on First-Order Statistics", IEEE International Conference on Acoustics, Speech and Signal Processing 2004, vol. 4, May 17, 2004, pp. IV-529 to IV-532.

Takatoshi Ogawa et al., "UWB over Fiber Denso System no Kaihatsu to Denpan Sokutei eno Oyo", 2004 Nen the Institute of Electronics, Information and Communication Engineers Sogo Taikai Koen Ronbunshu, Kiso Kyokai, Mar. 8, 2004, p. 170.

* cited by examiner

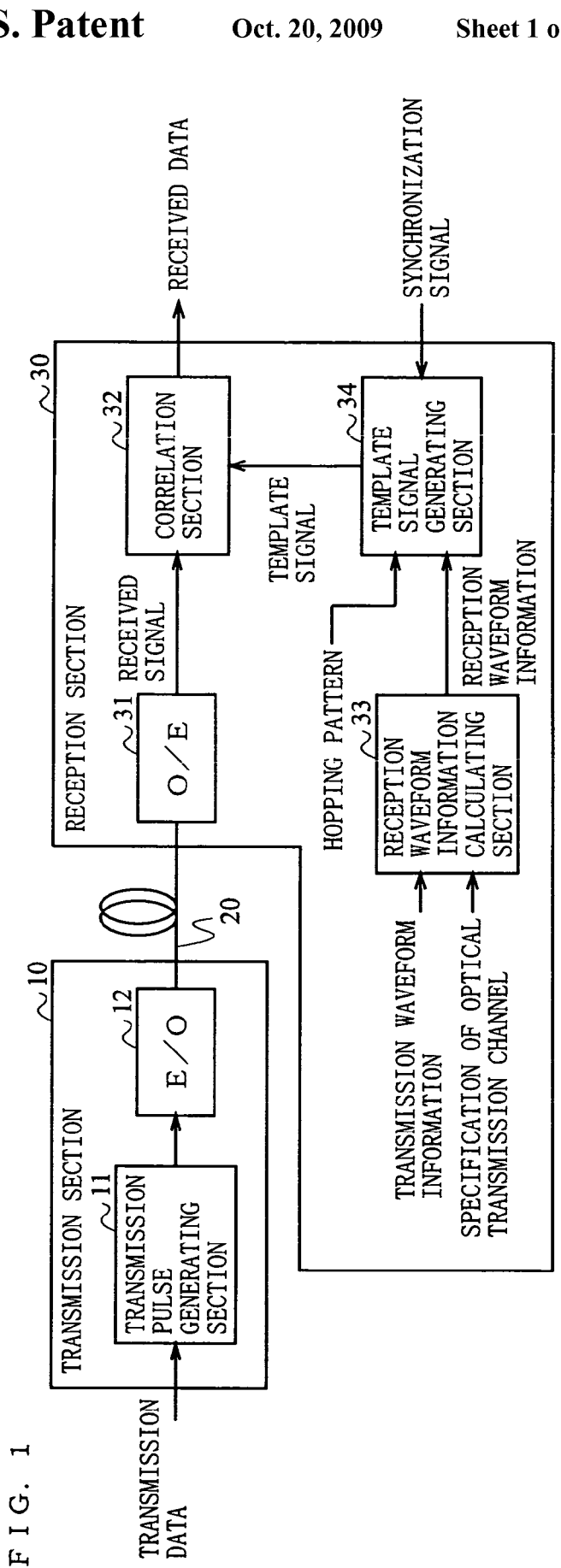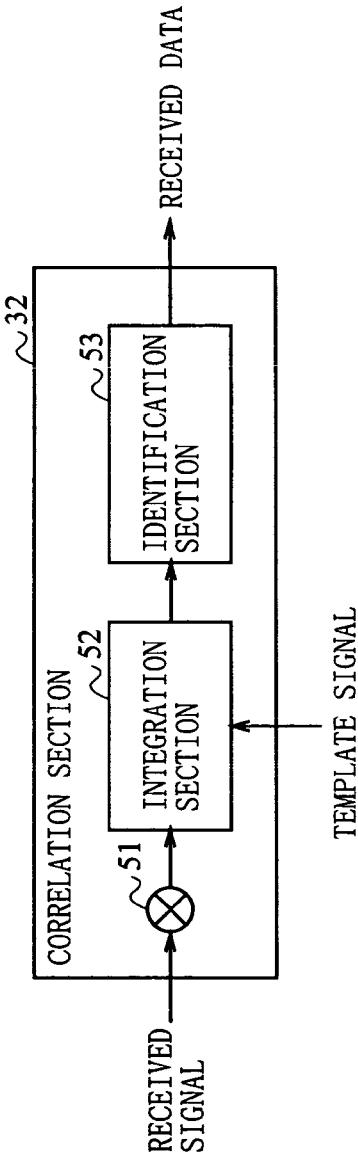

F I G. 1 4 (PRIOR ART)

PULSE SIGNAL DEMODULATION DEVICE

TECHNICAL FIELD

The present invention relates to a demodulation device which is used in a system for transmitting a pulse signal and demodulates a received pulse signal, and more particularly, to a demodulation device which is used in a system for converting a pulse signal into an optical signal before transmission.

BACKGROUND ART

In recent years, attention has been attracted by ultra-wide band (UWB) type communication using a short pulse signal. In the technique, a short-width pulse is used to obtain spread spectrum, thereby suppressing transmission power per unit frequency and enabling coexistence with other signals. The UWB technique has been vigorously researched and developed mainly in the field of short-distance wireless transmission, and started to be studied partly in the field of wired or optical transmission.

Patent Document 1 describes a demodulation device which demodulates a short-pulse signal used in the UWB technique. FIG. 14 is a diagram illustrating a configuration of the conventional demodulation device described in Patent Document 1. FIG. 15 is a diagram illustrating waveforms of signals output from major sections of the demodulation device of FIG. 14. Note that (a) to (c) and (e) illustrated in FIG. 14 indicate that signals illustrated with (a) to (c) and (e) of FIG. 15 are output in directions indicated with arrows, respectively.

The demodulation device 300 of FIG. 14 is wirelessly connected to a transmission device (not shown), and demodulates a wireless signal transmitted from the transmission device. The demodulation device 300 includes a correlation section 320, a template signal generating section 340, a synchronization section 350.

The demodulation device 300 inputs a received wireless signal as a received signal into the correlation section 320. FIG. 15(a) is a diagram illustrating a waveform of the received signal (short-pulse signal) input to the correlation section 320.

The template signal generating section 340 generates a template signal based on a synchronization signal output from the synchronization section 350 (described below) and a hopping pattern, and outputs the template signal to the correlation section 320. The hopping pattern is a pattern, such as that illustrated in FIG. 15(b), which indicates timings with which pulses to be received are present.

FIG. 15(c) is a diagram illustrating a waveform of the template signal output from the template signal generating section 340. The template signal is a signal which has a waveform similar to that of the received signal and is in synchronized with the received signal.

The correlation section 320 obtains a correlation value between the waveform of the received signal and the waveform of the template signal to demodulate the received signal, and outputs the received signal as received data. FIG. 15(d) is a diagram illustrating the correlation value obtained by the correlation section 320. FIG. 15(e) is a diagram illustrating the received data output from the correlation section 320.

When the obtained correlation value is larger than or equal to a positive threshold value (e.g., 0.5), the correlation section 320 identifies data "1". On the other hand, when the obtained correlation value is smaller than or equal to a negative threshold value (e.g., −0.5), the correlation section 320 identifies data "0". When the obtained correlation value is neither larger than or equal to the positive threshold value nor smaller than or equal to the negative threshold value, the correlation section 320 identifies that there is not a pulse. For example, when the waveform of the received signal completely matches the waveform of the template signal, the correlation value obtained by the correlation section 320 is +1. On the other hand, the waveform of the received signal and the waveform of the template signal have phases completely reverse to each other, the correlation value obtained by the correlation section 320 is −1.

The synchronization section 350 outputs a synchronization signal which is in synchronization with the received signal, to the template signal generating section 340. Also, the synchronization section 350 adjusts the phase of the synchronization signal so that the correlation value in the case of data "1" is maximized.

Note that, typically, in order to effectively obtain spread spectrum, time hopping is performed in which a pulse position within a bit cycle is changed per bit based on a pseudo-random pattern. However, in FIG. 15, for the sake of simplicity, the pulse position within the bit cycle is assumed to be fixed.

As described above, the demodulation device can demodulate a short-pulse signal received wirelessly, by obtaining a correlation value between a received signal and a template signal.

Patent Document 1: Japanese National Phase PCT Laid-Open Publication No. 11-504480

DISCLOSURE OF THE INVENTION

Problems to be Solved by the Invention

A template signal generated in the conventional demodulation device has the same waveform as that of a signal transmitted from the transmission device. However, when the signal is transmitted, a distortion occurs in the waveform of the signal in a transmission channel, the received signal cannot be correctly demodulated. For example, the signal which should be demodulated as data "1" should completely match the waveform of the template signal. However, when a distortion occurs in the waveform of the received signal, the absolute value of a correlation value obtained between the received signal and the template signal is reduced.

As a result, since the absolute value of the correlation value obtained by the correlation section is reduced, the error rate of the demodulated data increases. Thus, the conventional demodulation device cannot correctly modulate a short-pulse signal in which a waveform distortion occurs. The problem that a signal having a waveform distortion cannot be correctly demodulated, is not limited to the case where a short-pulse signal is demodulated, and may arise when other pulse signals, such as an RZ signal and the like, are demodulated.

Therefore, for example, when a pulse signal to be transmitted is converted into an optical signal before transmission, a pulse signal needs to be demodulated, taking into consideration that a waveform deteriorating factor specific to an optical transmission channel is present in the optical transmission channel. However, since a waveform distortion occurring in the optical signal is not taken into consideration when the template signal is generated by the conventional demodulation device, the pulse signal cannot be correctly demodulated when the conventional demodulation device is applied to an optical transmission system.

Therefore, an object of the present invention is to provide a pulse signal demodulation device capable of correctly demodulating a pulse signal in an optical transmission system in which a pulse signal is converted into an optical signal before transmission.

Solution to the Problems The present invention provides a pulse signal demodulation device for receiving a pulse signal converted into an optical signal via an optical transmission channel, and demodulating the pulse signal. The device comprises an optical-to-electrical conversion section for converting the received optical signal into an electrical signal, and outputting the electrical signal as a received signal, a reception waveform information calculating section for outputting, as reception waveform information, information about a shape of a waveform of the pulse signal on which a distortion occurring during the time from when the pulse signal is converted to the optical signal to when the optical signal is converted into the received signal by the optical-to-electrical conversion section, is reflected, a template signal generating section for generating a template signal which has a waveform on which a distortion similar to the distortion occurring in the received signal is reflected, and is in synchronization with the received signal, based on the reception waveform information output from the reception waveform information calculating section and a synchronization signal which is in synchronization with the received signal, and a correlation section for demodulating the pulse signal by obtaining a correlation between waveforms of the received signal output from the optical-to-electrical conversion section and the template signal generated by the template signal generating section.

Thereby, in the case where a pulse signal is optically transmitted, even when a distortion occurs in a waveform of an optical signal, a template signal having a waveform on which a distortion similar to a distortion occurring in a received signal is reflected, can be generated. Thereby, when a correlation value is obtained based on the received signal and the template signal, the absolute value of the correlation value is not reduced. Therefore, the pulse signal can be correctly demodulated.

Preferably, the reception waveform information calculating section may generate the reception waveform information based on a waveform of the pulse signal as it is transmitted, and information about the optical transmission channel.

Thereby, it is possible to generate a template signal on which a distortion occurring in an optical signal in an optical transmission channel, or the like, based on a waveform of the optical signal as it is transmitted. Therefore, it is possible to generate a template signal, depending on a waveform of an optical signal or a property of an optical transmission channel.

The pulse signal may be a short-pulse signal which occupies a frequency band having a width larger than that of a frequency band when a bit rate is converted into Hertz.

As an example, the reception waveform information calculating section outputs, as reception waveform information, amplitudes and phases of a frequency component corresponding to an integral multiple of a peak frequency of a spectrum of the pulse signal, and the peak frequency component, in the distortion occurring in the pulse signal. The template signal generating section includes a plurality of sine wave generating sections for generating a sine wave signal having the peak frequency and a sine wave signal having a frequency which is an integral multiple of the peak frequency, a plurality of amplitude/phase adjusting sections for adjusting amplitudes and phases of the sine wave signals generated by the plurality of sine wave generating sections, based on the reception waveform information, and a wave combining section for combining the sine wave signals having the amplitudes and the phases adjusted by the plurality of amplitude/phase adjusting sections.

Thereby, it is possible to generate a template signal on which a harmonic distortion occurring in a received signal is reflected. Therefore, a pulse signal can be correctly demodulated without a decrease in the absolute value of a correlation value. Also, since a template signal is generated based on a peak frequency component and integral multiple frequency components thereof of a signal, the template signal generating section can be composed of low-rate parts as compared to, for example, when any arbitrary waveform generator is used to generate a template signal. Therefore, the pulse signal demodulation device can be constructed with low cost.

The template signal generating section may further include a mask section for passing the combined signal obtained by the wave combining section, based a hopping pattern indicating timing of a pulse to be received, to generate the template signal.

Thereby, it is possible to demodulate a multiply transmitted signal.

The pulse signal may be an RZ signal.

As an example, the reception waveform information calculating section outputs, as reception waveform information, amplitudes and phases of a frequency component corresponding to an integral multiple of a peak frequency of a spectrum of the pulse signal, and the peak frequency component, in the distortion occurring in the pulse signal. The template signal generating section includes a plurality of sine wave generating sections for generating a sine wave signal having the peak frequency and a sine wave signal having a frequency which is an integral multiple of the peak frequency, a plurality of amplitude/phase adjusting sections for adjusting amplitudes and phases of the sine wave signals generated by the plurality of sine wave generating sections, based on the reception waveform information, a wave combining section for combining the sine wave signals output by the plurality of amplitude/phase adjusting sections, and a bias section for adding a bias to the combined sine wave signal obtained by the wave combining section so that a minimum value of the combined sine wave signal is "0", and outputting the resultant signal as a template signal.

Thereby, it is possible to generate a template signal on which a harmonic distortion occurring in a received signal is reflected. Therefore, a pulse signal can be correctly demodulated without a decrease in the absolute value of a correlation value. Also, since a template signal is generated based on a peak frequency component and integral multiple frequency components thereof of a signal, the template signal generating section can be composed of low-rate parts as compared to, for example, when any arbitrary waveform generator is used to generate a template signal. Therefore, the pulse signal demodulation device can be constructed with low cost.

The information about the optical transmission channel may include a chirp parameter of a semiconductor laser or an optical modulator used as a transmitter for transmitting the optical signal, and a total dispersion amount of the optical transmission channel in a wavelength of the optical signal. The reception waveform information calculating section may calculate a transmitted light spectrum based on a waveform of the pulse signal as it is transmitted, and a chirp parameter, calculates a received light spectrum based on the transmitted light spectrum and the total dispersion amount of the optical transmission channel, calculates a received signal spectrum converted into an electrical signal based on the received light spectrum, and outputs information about the received signal spectrum as reception waveform information.

Thereby, it is possible to generate a template signal on which an influence of a chirp in an optical signal and an influence of wavelength dispersion in an optical transmission channel, are reflected. Therefore, even when a waveform distortion occurs due to wavelength dispersion on an optical transmission channel, a pulse signal can be correctly demodulated.

The correlation section may output a calculated correlation value to the reception waveform information calculating section. The reception waveform information calculating section may change the information about the optical transmission channel to generate the reception waveform information, and sets the information about the optical transmission channel to be a value when the correlation value obtained by the correlation section is maximized.

Thereby, information about an optical transmission channel can be set to be a value when a correlation value is maximized. Therefore, even when the information about the optical transmission channel is not clear, it is possible to estimate and set the information about the optical transmission channel to be an optimal value.

The correlation section may include a multiplication section for multiplying the received signal with the template signal, an integration section for calculating an integral of the signal multiplied by the multiplication section over a period of time corresponding to one bit, and an identification section for identifying the signal integrated by the integration section, and outputting the identified value.

Thereby, it is possible to construct a correlation section without a high-speed digital circuit. Therefore, a pulse signal demodulation device can be constructed with low cost.

As an example, a test pulse signal converted into an optical signal is transmitted to the pulse signal demodulation device, and the reception waveform information calculating section generates the reception waveform information based on a waveform of the test pulse signal output from the optical-to-electrical conversion section.

Thereby, based on a waveform of an actually received signal, it is possible to generate a template signal on which a distortion occurring in the received signal is reflected. Thereby, it is not necessary to previously store, into a memory, information for calculating waveform information. In addition, for example, when a distortion occurs in a signal waveform due to a plurality of waveform deteriorating factors, it is not necessary to perform a complicated calculation so as to calculate reception waveform information.

A storage section for storing a waveform of the pulse signal as it is transmitted, and the information about the optical transmission channel, may be provided. Further, an input section for inputting the waveform of the pulse signal as it is transmitted, and the information about the optical transmission channel, may be provided. The storage section may store the waveform of the pulse signal as it is transmitted, and the information about the optical transmission channel which are input from the input section.

Thereby, it is possible to easily change a waveform of a pulse signal as it is transmitted, and information for an optical transmission channel which are used when a reception waveform information calculating section calculates reception waveform information. Therefore, it is possible to flexibly support a difference in an individual condition, such as a transmission distance or the like.

EFFECT OF THE INVENTION

According to the present invention, in an optical transmission system in which a pulse signal is converted into an optical signal before transmission, a pulse signal demodulation device capable of correctly demodulating a pulse signal is provided.

BRIEF DESCRIPTION OF THE DRAWINGS

FIG. 1 is a block diagram illustrating a configuration of an optical transmission system to which a pulse signal demodulation device 30 according to a first embodiment of the present invention is applied.

FIG. 2 is a block diagram illustrating a detailed exemplary configuration of the correlation section 32.

Figure 3:
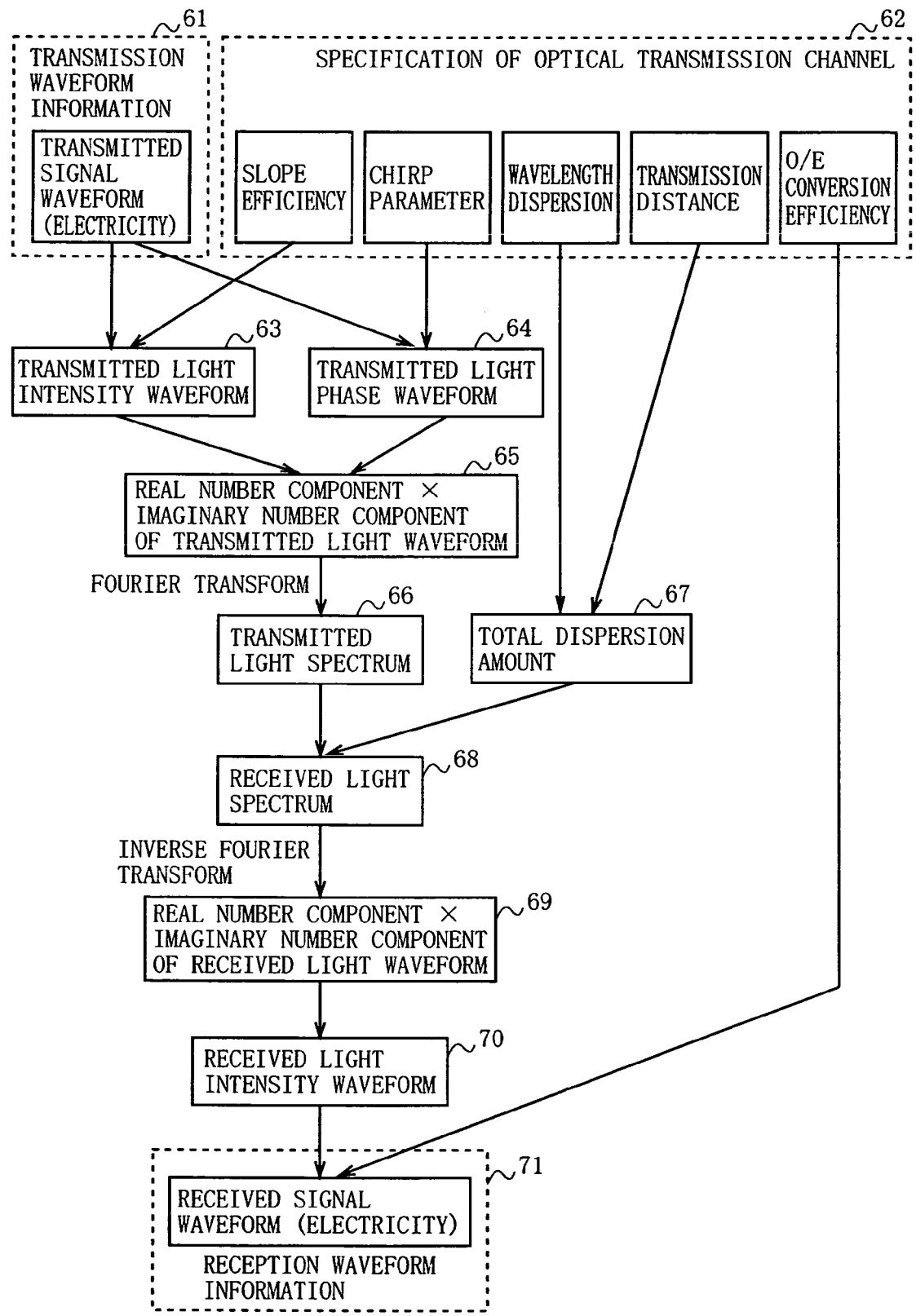
FIG. 3 is a diagram for specifically explaining a method for calculating reception waveform information.

DESCRIPTION OF THE REFERENCE CHARACTERS 10 transmission device
11 transmission pulse generating section
12 electrical-to-optical conversion section
13 RZ modulation section
20 optical transmission channel
30, 300 pulse signal demodulation device
31 optical-to-electrical conversion section
32, 320 correlation section
33 reception waveform information calculating section
34, 340 template signal generating section
35 storage section
36 input section
411, 412, 413 sine wave generating section
421, 422, 423 amplitude/phase setting section
43 wave combining section
44 mask section
45 bias section
51 multiplication section
52 integration section
53 identification section
350 synchronization section

BEST MODE FOR CARRYING OUT THE INVENTION

Hereinafter, embodiments of the present invention will be described with reference to the accompanying drawings.

First Embodiment

FIG. 1 is a block diagram illustrating a configuration of an optical transmission system to which a pulse signal demodulation device 30 according to a first embodiment of the present invention is applied. The optical transmission system includes a transmission device 10 and the pulse signal demodulation device 30. The transmission device 10 and the pulse signal demodulation device 30 are connected via an optical transmission channel 20.

The transmission device 10 converts a short-pulse signal which is used in an ultra-wide band (UWB) communication scheme into an optical signal, and transmits the optical signal via the optical transmission channel 20 to the pulse signal demodulation device 30. The short-pulse signal used in the UWB communication scheme occupies a frequency band having a width larger than that of a frequency band when a bit rate is converted into Hertz. When receiving the optical signal transmitted via the optical transmission channel 20, the pulse signal demodulation device 30 converts the optical signal into an electrical signal, and demodulates the electrical signal.

In FIG. 1, the transmission device 10 includes a transmission pulse generating section 11 and an electrical-to-optical conversion section 12. The pulse signal demodulation device 30 includes an optical-to-electrical conversion section 31, a correlation section 32, a reception waveform information calculating section 33, and a template signal generating section 34.

The transmission pulse generating section 11 modulates transmission data to be transmitted to the pulse signal demodulation device 30, converts the transmission data into a short-pulse signal, and outputs the short-pulse signal as a transmission signal to the electrical-to-optical conversion section (E/O) 12. The electrical-to-optical conversion section 12 converts the transmission signal output from the transmission pulse generating section 11 into an optical signal, and outputs the optical signal to the optical transmission channel 20. The optical signal converted by the electrical-to-optical conversion section 12 is transmitted through the optical transmission channel 20 and is input to the optical-to-electrical conversion section (O/E) 31 of the pulse signal demodulation device 30.

The optical-to-electrical conversion section 31 converts the optical signal transmitted via the optical transmission channel 20 to the transmission device 10, into an electrical signal, and outputs the electrical signal as a received signal to the correlation section 32.

The reception waveform information calculating section 33 calculates a waveform of a transmission signal on which a distortion which may occur in the received signal is reflected, based on transmission waveform information and a specification of the optical transmission channel, and outputs information about a shape of the calculated waveform, as reception waveform information, to the template signal generating section 34. The transmission waveform information is information about a shape of a pulse in a transmission signal output from the transmission pulse generating section 11. The transmission waveform information is represented by a width or an amplitude of a pulse, for example. The specification of the optical transmission channel is information indicating a property of the optical transmission channel. For example, the specification of the optical transmission channel is information indicating a length of the optical transmission channel 20 connecting between the transmission device 10 and the pulse signal demodulation device 30, or a property (a material property, a structure, etc.) of the optical transmission channel 20. The transmission waveform information and the specification of the optical transmission channel are input to the reception waveform information calculating section 33.

During the time when a transmission signal is converted into an optical signal, the optical signal is transmitted through the optical transmission channel 20, and the optical signal is converted into a received signal by the optical-to-electrical conversion section 31 of the pulse demodulation device, a distortion occurs in a waveform of the signal. The reception waveform information is information about a shape of a waveform of a transmission signal on which a distortion occurring in a received signal is reflected. The reception waveform information is represented by a width or an amplitude of a pulse, for example. Hereinafter, a cause for a distortion occurring in an optical signal, and the reception waveform information generated by the reception waveform information calculating section 33, will be specifically described.

When an optical signal converted by the electrical-to-optical conversion section 12 of the transmission device 10 is affected by wavelength dispersion during transmission through the optical transmission channel 20, a distortion may occur in a waveform of the optical signal. The wavelength dispersion refers to a phenomenon that, when a pulse signal is propagated through an optical transmission channel, a delay time varies among different light frequency components included in the pulse signal, resulting in occurrence of a spread in a waveform thereof. In this case, a distortion occurs in the waveform of the received signal output from the optical-to-electrical conversion section 31 of the pulse signal demodulation device 30.

Before an optical signal is input to the optical-to-electrical conversion section 31, not only an intensity thereof is modulated, but also a phase thereof is additionally modulated in a semiconductor laser or an optical modulator which is used to convert an electrical signal into an optical signal, in the electrical-to-optical conversion section 12. The degree of the additional phase modulation with respect to the optical signal is determined, depending on a chirp parameter of the semiconductor laser or the optical modulator. The chirp parameter refers to a parameter indicating a ratio of the degree of phase modulation and the degree of intensity modulation occurring in the semiconductor laser or the optical modulator. Due to the additional phase modulation, the spectrum of the optical signal is spread, so that a distortion occurring in the waveform of the received signal due to the wavelength dispersion becomes more significant.

Therefore, when a distortion occurs in an optical signal due to wavelength dispersion, the specification of the optical transmission channel to be input to the reception waveform information calculating section 33 includes a total dispersion amount of the optical transmission channel 20 in wavelengths of the optical signal, and the chirp parameter of the semiconductor laser. Note that the total dispersion amount is obtained from a product of the wavelength dispersion of the optical transmission channel 20 in the wavelengths of the optical signal and a transmission distance, and therefore, the specification of the optical transmission channel may include information about the wavelength dispersion and the transmission distance instead of the total dispersion amount. The reception waveform information calculating section 33 generates the reception waveform information based on the input transmission waveform information, the input total dispersion amount obtained as the product of the wavelength dispersion and the transmission distance, and the input chirp parameter. Note that, preferably, the specification of the optical transmission channel may include the slope efficiency of the semiconductor laser and the conversion efficiency of the optical-to-electrical conversion section 31. Thereby, the accuracy of the obtained reception waveform information can be improved.

FIG. 3 is a diagram for specifically explaining a method for calculating the reception waveform information. Hereinafter, a method for calculating the reception waveform information according to this embodiment will be described with reference to FIG. 3. Note that, in FIG. 3, an example is described in which transmission waveform information 61 includes information about a waveform of a transmission signal (electrical signal), and a specification 62 of an optical transmission channel includes a slope efficiency, a chirp parameter, a wavelength dispersion, a a transmission distance, and a conversion efficiency (O/E conversion efficiency) of the optical-to-electrical conversion section 31.

Initially, a transmitted light intensity waveform 63 is obtained from a product of a waveform I(t) of a transmission signal indicated by the transmission waveform information 61 and the slope efficiency. Also, in this case, a transmitted light phase waveform φ(t) 64 is calculated from the waveform I(t) of the transmission signal and a chirp parameter α by the following expression 1.

$$\phi(t) = -\frac{\alpha}{2}\ln(I(t))$$ [Expression 1]

Next, a real number component and an imaginary component of a transmitted light waveform 65 are obtained from the transmitted light intensity waveform 63 and the transmitted light phase waveform 64. Thereafter, based on the obtained real number component and imaginary number component of the transmitted light waveform 65, a transmitted light spectrum 66 is obtained by Fourier transform. Next, based on the transmitted light spectrum 66 and a total dispersion amount 67 obtained from a product of the wavelength dispersion and the transmission distance, a delay amount of each light frequency component is obtained to calculate a received light spectrum 68. Thereafter, a received light intensity waveform 70 is obtained by inverse Fourier transform. Finally, a received signal waveform (electricity) obtained from a product of the received light intensity waveform 70 and the conversion efficiency is output as reception waveform information 71 to the template signal generating section 34.

The template signal generating section 34 generates a template signal for demodulating a received signal and outputs the template signal to the correlation section 32. The template signal generating section 34 receives a hopping pattern generated by a hopping pattern generating section (not shown) and a synchronization signal generated by a synchronization signal generating section (not shown). The hopping pattern indicates timings with which pulses to be received are present. The synchronization signal is a signal which is in synchronization with the received signal. The template signal generating section 34 generates the template signal based on the reception waveform information output from the reception waveform information calculating section 33, the hopping pattern, and the synchronization signal.

Initially, the template signal generating section 34 generates a signal based on the reception waveform information. In this case, the generated signal has a waveform on which a distortion similar to a distortion occurring in the received signal is reflected. Thereafter, the template signal generating section 34 outputs the generated signal to the correlation section 32 in synchronization with the received signal input to the correlation section 32, based on the synchronization signal. In this case, the template signal generating section 34 outputs the generated signal in a pattern which matches the hopping pattern. For example, when the hopping pattern is "1", the template signal generating section 34 outputs the signal, and conversely, when the hopping pattern is "0", the template signal generating section 34 does not output the signal. Thereby, the template signal which has a waveform on which a distortion similar to a distortion occurring in the received signal is reflected and is in synchronization with the received signal, is input to the correlation section 32.

Note that, in the present invention, means for generating the synchronization signal is not limited, as long as the synchronization signal is a signal which is in synchronization with the received signal. For example, the synchronization signal may be generated using any arbitrary waveform generator.

The correlation section 32 obtains a correlation value between the received signal output from the optical-to-electrical conversion section 31 and the template signal output from the template signal generating section to demodulate the received signal, and outputs the resultant signal as received data to the outside. Initially, the correlation section 32 calculates a correlation value R from a received signal waveform A(t) and a template signal waveform B(t) by the following expression 2.

$$R = \frac{1}{T}\int_{-T/2}^{T/2} A(t)B(t)\,dt$$ [Expression 2]

Note that the received signal waveform A(t) and the template signal waveform B(t) are assumed to be normalized to satisfy the following expression 3.

$$\frac{1}{T}\int_{-T/2}^{T/2}\{A(t)\}^2 dt = \frac{1}{T}\int_{-T/2}^{T/2}\{B(t)\}^2 dt = 1 \quad \text{[Expression 3]}$$

When the correlation value calculated from expression 2 is larger than or equal to a predetermined positive value (e.g., 0.5), the correlation section 32 identifies "1". When the correlation value calculated from expression 2 is smaller than or equal to a predetermined negative value (e.g., −0.5), the correlation section 32 identifies "0". When the correlation value calculated from expression 2 is neither larger than or equal to the predetermined positive value nor smaller than or equal to the predetermined negative value, the correlation section 32 identifies that there is not a pulse.

FIG. 2 is a block diagram illustrating a detailed exemplary configuration of the correlation section 32. In FIG. 2 the correlation section 32 has a multiplication section 51, an integration section 52, and an identification section 53.

The multiplication section 51 multiplies the received signal with the template signal, and outputs the resultant product value to the integration section 52.

The integration section 52 calculates an integral of the product output from the multiplication section 51 over a period of time corresponding to one bit (bit cycle), and outputs the resultant integral value to the identification section 53. The integral value output from the integration section 52 corresponds to a correlation value obtained from expression 2.

The identification section 53 identifies the correlation value output from the integration section 52, and determines whether the correlation value is larger than or equal to the predetermined positive value or smaller than or equal to the predetermined negative value.

Note that the configuration of the correlation section 32 of FIG. 2 is only for illustrative purposes. The configuration of the correlation section 32 is not limited to the above-described configuration, as long as the correlation value can be obtained. For example, the correlation section 32 may be configured to perform the calculation of expression 2 by digital numerical computation. As described above, according to this embodiment, in the case where a short-pulse signal is optically transmitted, even when a distortion occurs in the waveform, a template signal having a waveform on which a distortion similar to a distortion occurring in a received signal is reflected, can be generated. Thereby, when a correlation value is obtained based on the received signal and the template signal, the absolute value of the correlation value is not reduced. Therefore, the short-pulse signal can be correctly demodulated.

Note that, in this embodiment, the specification of the optical transmission channel is input to the reception waveform information calculating section via an input section which is not shown. Here, the reception waveform information calculating section may previously store information about the specification of the optical transmission channel. Alternatively, the reception waveform information calculating section may obtain the specification of the optical transmission channel by monitoring the optical transmission channel. For example, a test pulse signal may be transmitted from the transmission device 10, and it is detected in the pulse signal demodulation device how an amplitude or a frequency component of a received test pulse signal is changed as compared to the pulse signal as it is transmitted, thereby making it possible to calculate the specification of the optical transmission channel. Note that the optical transmission channel may be monitored by other methods, which do not directly relate to the essence of the present invention and will not be described in detail.

Variation of First Embodiment

Next, a variation of the first embodiment will be described. A pulse signal demodulation device according to this variation is different from the pulse signal demodulation device of the first embodiment in that the specification of the optical transmission channel is previously set in the first embodiment, but the specification of the optical transmission channel is calculated in this variation.

Figure 4:
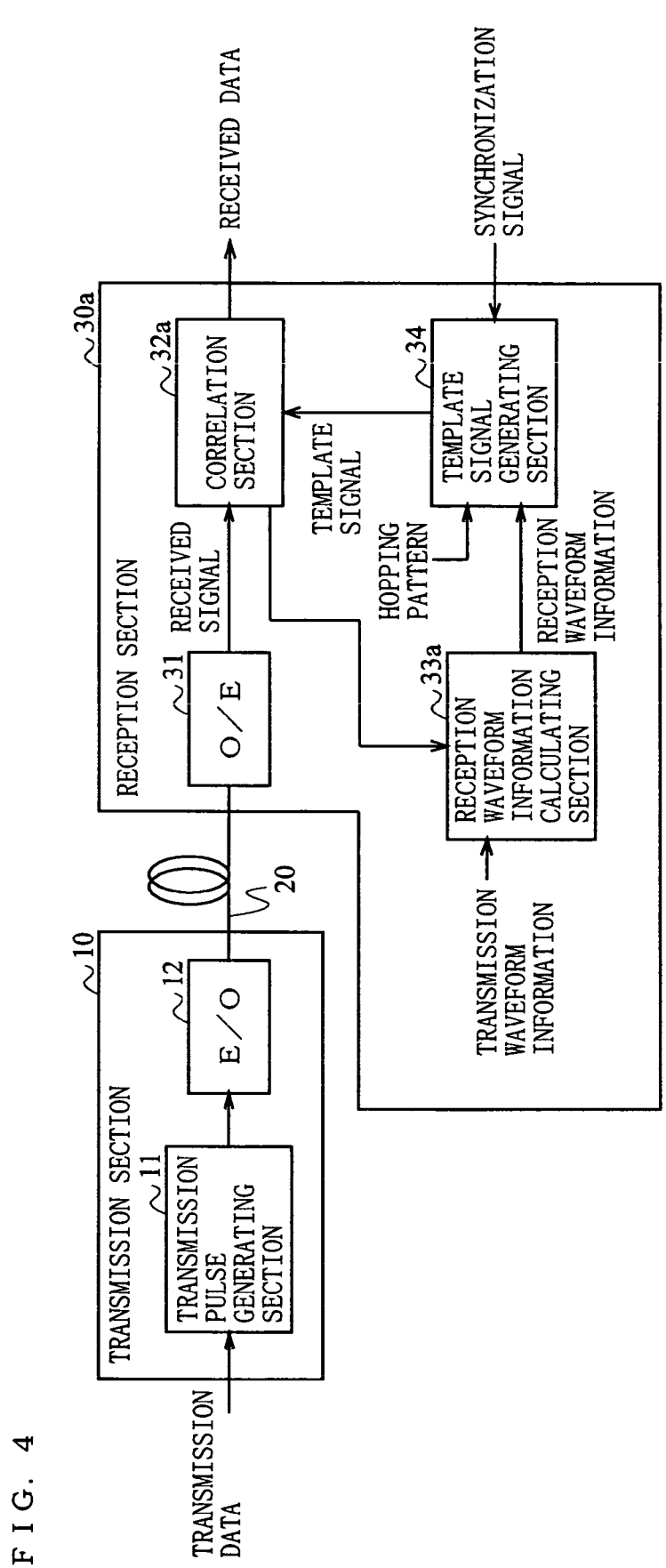
FIG. 4 is a block diagram illustrating a configuration of an optical transmission system to which a pulse signal demodulation device 30a of a variation of the first embodiment is applied.

FIG. 4 is a diagram illustrating a configuration of an optical transmission system to which a pulse signal demodulation device 30a of this variation is applied. The optical transmission system includes a transmission device 10 and a pulse signal demodulation device 30a. The transmission device 10 and the pulse signal demodulation device 30a are connected via an optical transmission channel 20.

The pulse signal demodulation device 30a includes an optical-to-electrical conversion section 31, a correlation section 32a, a reception waveform information calculating section 33a, and a template signal generating section 34. The pulse signal demodulation device 30a of this variation is different from the pulse signal demodulation device 30 of the first embodiment in operations of the reception waveform information calculating section 33a and the correlation section 32a. The other components are similar to those of the first embodiment, and therefore, components similar to those of FIG. 1 are indicated with the same reference numerals and will not be described. A transmission pulse generating section 11 and an electrical-to-optical conversion section 12 have functions similar to those of the first embodiment and will not be described.

The correlation section 32a obtains a correlation value between a received signal output from the optical-to-electrical conversion section 31 and a template signal output from the template signal generating section. The correlation section 32a outputs the obtained correlation value to the reception waveform information calculating section 33a. Also, the correlation section 32a outputs demodulated received data to the outside.

The reception waveform information calculating section 33a changes reception waveform information to be output to the template signal generating section 34 to determine the specification of an optical transmission channel so that the correlation value output from the correlation section 32a is maximized. Thereafter, the reception waveform information calculating section 33a generates reception waveform information based on transmission waveform information and the determined specification of the optical transmission channel, and outputs the reception waveform information to the template signal generating section 34.

As the specification of the optical transmission channel approaches an optimal value, the waveform of the template signal output from the template signal generating section 34 approaches the waveform of the received signal, and therefore, the correlation value obtained by the correlation section increases. Therefore, for example, when a distortion occurs in an optical signal due to wavelength dispersion, the values of a chirp parameter and a total dispersion amount may be set to be values which maximize the correlation value. Hereinafter, the case where a distortion occurs in an optical signal due to wavelength dispersion will be described as an example.

Figure 5:
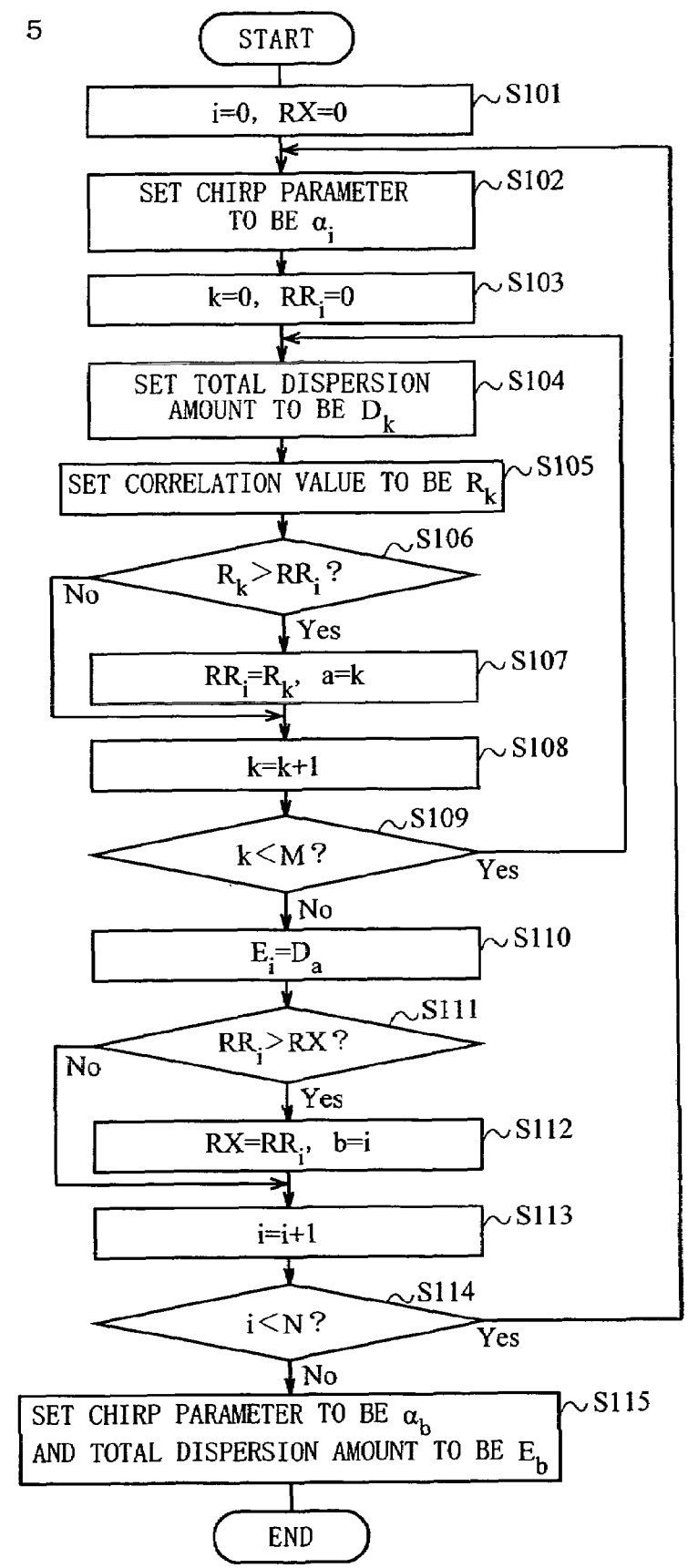
FIG. 5 is a flowchart illustrating an operation a reception waveform information calculating section 33a of FIG. 4.

FIG. 5 is a flowchart illustrating an operation the reception waveform information calculating section 33a of FIG. 4. Hereinafter, a procedure for estimating the specification of the optical transmission channel will be described with reference to FIG. 5, where the specification of the optical transmission channel is composed of a chirp parameter and a total dispersion amount, for example.

Initially, the reception waveform information calculating section 33a prepares N set values i for the chirp parameter within a range in which the chirp parameter can take a value, i.e., chirp parameters $\alpha_i$ (i=0, 1, . . . , N−1). Similarly, the reception waveform information calculating section 33a prepares M set values k within a range in which the total dispersion amount can take a value, i.e., total dispersion amounts $D_k$ (k=0, 1, . . . , M−1).

Thereafter, the reception waveform information calculating section 33a sets the chirp parameter set value i to be 0 and a correlation value RX to be 0 (step S101). Thereafter, the reception waveform information calculating section 33a sets the value of the chirp parameter to be $\alpha_i$ (step S102).

The reception waveform information calculating section 33a sets the total dispersion amount set value k to be 0 and a correlation value $RR_i$ at the chirp parameter $\alpha_i$ to be 0 (step S103). Thereafter, the reception waveform information calculating section 33a sets the value of the total dispersion amount to be $D_k$ (step S104), and causes the correlation section 32a to measure the correlation value $R_k$ at that time (step S105).

Thereafter, the reception waveform information calculating section 33a determines whether or not the correlation value $R_k$ calculated by the correlation section 32a is larger than the correlation value $RR_i$ at the chirp parameter set value i (step S106). When the correlation value $R_k$ is larger than the correlation value $RR_i$ at the chirp parameter set value i, the reception waveform information calculating section 33a substitutes the correlation value $R_k$ at the total dispersion amount $D_k$ into the correlation value $RR_i$ at the chirp parameter set value i (step S107). Also, the reception waveform information calculating section 33a substitutes the value of k at that time into a set value a, and stores the set value a.

On the other hand, when the correlation value $R_k$ is smaller than the correlation value $RR_i$ at the chirp parameter set value i, the reception waveform information calculating section 33a adds 1 to the total dispersion amount set value k (step S108), and determines whether or not the total dispersion amount set value k is smaller than the number M of total dispersion amount set values (step S109). When the total dispersion amount set value k is smaller than the number M of total dispersion amount set values, the reception waveform information calculating section 33a returns to the operation of step S104, and causes the correlation section 32a to measure the correlation value $R_k$ at the total dispersion amount $D_k$.

On the other hand, when the total dispersion amount set value k is equal to the number M of total dispersion amount set values, the reception waveform information calculating section 33a substitutes a total dispersion amount $D_a$ at the stored set value a into $E_i$, and stores $E_i$. Thus, the reception waveform information calculating section 33a changes the total dispersion amount value to $D_1$ to $D_{M-1}$, and causes the correlation section 32a to measure the correlation value $R_1$ to $R_{M-1}$ at that time. Thereafter, when the measurement of the correlation value is finished for all values of $D_0$ to $D_{M-1}$, a maximum correlation value $RR_i$ within this range is obtained, and a total dispersion amount at that time is stored as $E_i$.

Next, the reception waveform information calculating section 33a determines whether or not the correlation value $RR_i$ at the chirp parameter set value i is larger than the correlation value RX (step S111). When the correlation value $RR_i$ at the chirp parameter set value i is larger than the correlation value RX, the correlation value $RR_i$ at the chirp parameter set value i is substituted into the correlation value RX (step S112). Also, the reception waveform information calculating section 33a substitutes the value of i at that time into a set value b, and stores the set value b. Thereafter, the reception waveform information calculating section 33a goes to an operation of step S113.

On the other hand, when the correlation value $RR_i$ at the chirp parameter set value i is smaller than the correlation value RX in step S111, the reception waveform information calculating section 33a goes to an operation of step S113.

In step S113, the reception waveform information calculating section 33a adds 1 to the value of i, and determines whether or not the value of i is smaller than the number N of chirp parameter set values (step S114). When the value of i is smaller than the number N of chirp parameter set values, the reception waveform information calculating section 33a returns to the operation of step S102.

On the other hand, the value of i is equal to the number N of chirp parameter set values, the reception waveform information calculating section 33a sets the chirp parameter to be $\alpha_b$, and the total dispersion amount to be $E_b$ (step S115).

As described above, the reception waveform information calculating section 33a sets the chirp parameter to be $\alpha_i$ for all the chirp parameter set values i=1 to N−1, and repeats the operations of steps S102 to S114, and for each case, obtains the maximum correlation value $RR_i$ and the total dispersion amount $E_i$ at that time. Finally, the reception waveform information calculating section 33a obtains a maximum value $RR_b$ of $RR_i$ and a chirp parameter $\alpha_b$ and a total dispersion amount $E_b$ corresponding to $RR_b$. Thereafter, the reception waveform information calculating section 33a sets a chirp parameter and a total dispersion amount used for calculation to be $\alpha_b$ and $E_b$, and ends the estimation of the specification of the optical transmission channel.

Note that, when rough values for guidance for the chirp parameter and the total dispersion amount are known, and it is only necessary to finely adjust these rough values, the set value ranges of the chirp parameter and the total dispersion amount may be narrowed. Conversely, when the values of the chirp parameter and the total dispersion amount are not known at all, the set value ranges of the chirp parameter and the total dispersion amount may be broadened. When the value of either the chirp parameter or the total dispersion amount is known, the known value may be fixed and the other value may be changed and estimated.

Although an influence of the wavelength dispersion has been herein described, when other waveform deteriorating factors (nonlinearity of input/output characteristics of a semiconductor laser or an optical modulator, etc.) cannot be ignored, influences of these factors may be taken into consideration as appropriate to calculate a received waveform.

Also, in this variation, the case where the reception waveform information is calculated based on the total dispersion amount and the chirp parameter has been described as an example. Here, when the slope efficiency, and the conversion efficiency of the optical-to-electrical conversion section are included in the specification of the optical transmission channel, rough values for guidance for these values can be previously obtained, and therefore, may be previously input to the reception waveform information calculating section.

As described above, according to this variation, even when the specification of the optical transmission channel is not clear, the specification of the optical transmission channel can be determined so that the correlation value is maximized. Thereby, even when a distortion occurs in an optical signal received by the pulse signal demodulation device, a template signal in which a distortion similar to that of the optical signal is caused to occur can be generated. Therefore, since the absolute value of the correlation value can be maintained high, the pulse signal can be correctly demodulated.

Second Embodiment

Figure 6:
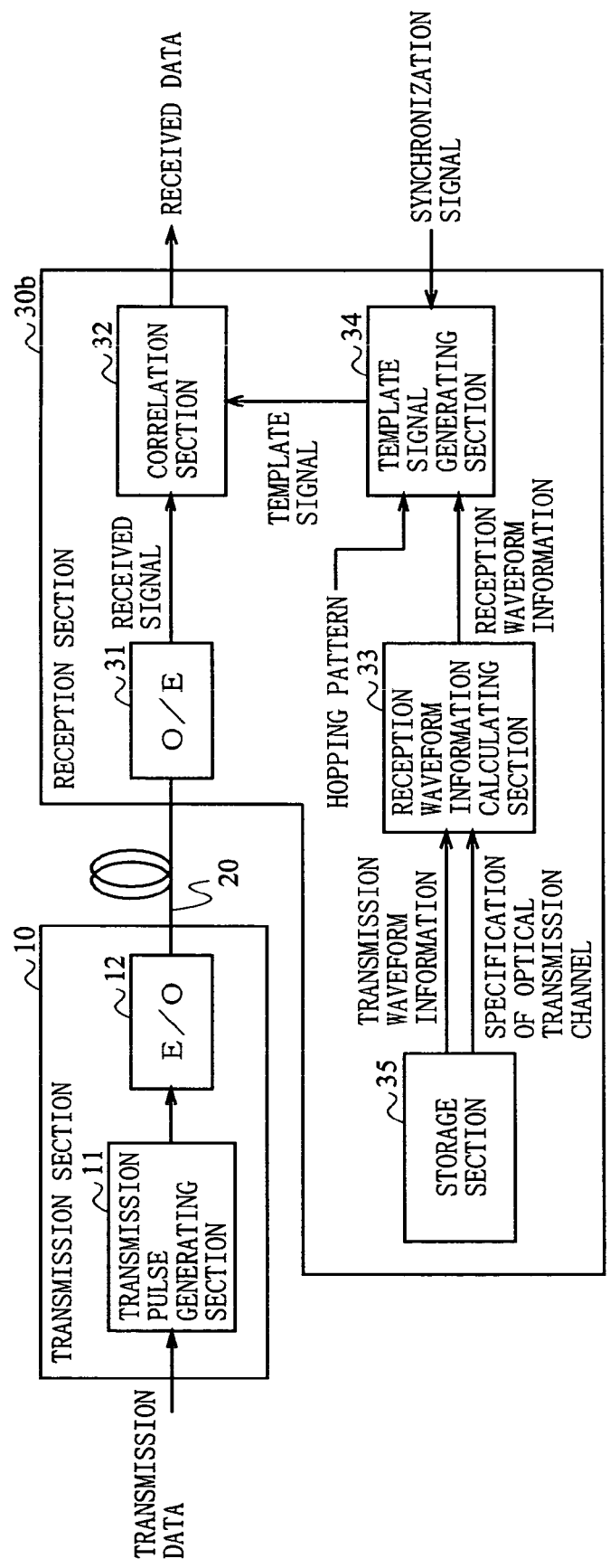
FIG. 6 is a block diagram illustrating a configuration of an optical transmission system to which a pulse signal demodulation device 30b according to a second embodiment of the present invention is applied.

FIG. 6 is a diagram illustrating a configuration of an optical transmission system to which a pulse signal demodulation device 30b according to a second embodiment of the present invention is applied. The optical transmission system of FIG. 6 includes a transmission device 10 and the pulse signal demodulation device 30b. The transmission device 10 and the pulse signal demodulation device 30b are connected via an optical transmission channel 20.

In FIG. 6, the pulse signal demodulation device 30b of this embodiment is different from the pulse signal demodulation device 30 of the first embodiment of FIG. 1 in that a storage section 35 is further provided. In FIG. 6, components similar to those of FIG. 1 are indicated with the same reference numerals and will not be described.

The storage section 35 stores the transmission waveform information and the specification of the optical transmission channel. The reception waveform information calculating section 33 reads out these pieces of information from the storage section 35, and calculates reception waveform information. Thus, according to this embodiment, the transmission waveform information and the specification of the optical transmission channel can be previously stored in the storage section during a manufacturing process.

Figure 7:
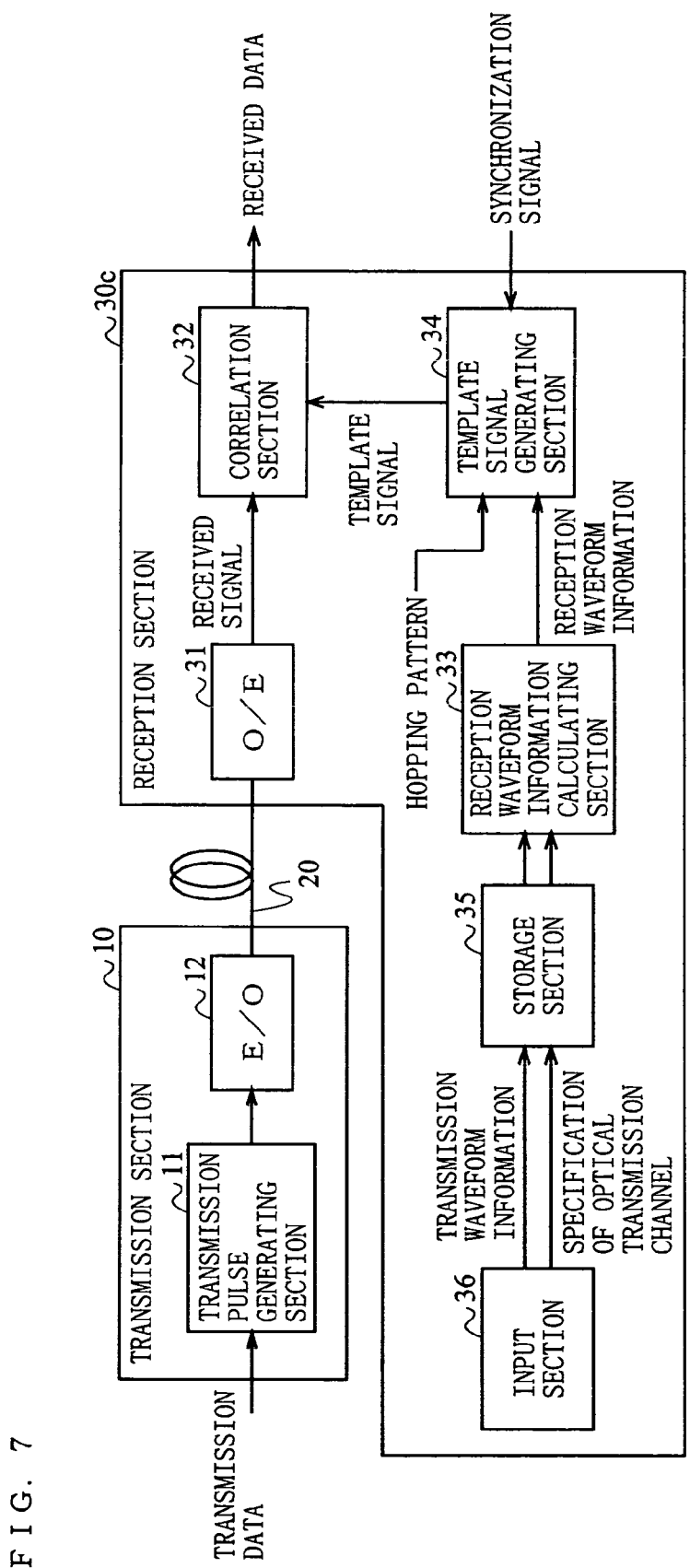
FIG. 7 is a block diagram illustrating a configuration of an optical transmission system to which a pulse signal demodulation device 30c of a variation of the second embodiment is applied.

The pulse signal demodulation device may further comprise an input section for inputting the transmission waveform information and the specification of the optical transmission channel. FIG. 7 is a diagram illustrating another exemplary configuration of the pulse signal demodulation device of this embodiment. The pulse signal demodulation device 30c of FIG. 7 is different from the pulse signal demodulation device 30b of FIG. 6 in that an input section 36 is further provided. In FIG. 7, components similar to those of FIG. 1 are indicated with the same reference numerals and will not be described.

The input section 36 is an input device, such as a keyboard, a touch panel, or the like, which accepts input of information, such as the transmission waveform information, the specification of the optical transmission channel, and the like. Also, the input section 36 may be an input means for inputting information to the pulse signal demodulation device using an interface, such as USB (Universal Serial Bus), GPIB (General Purpose Interface Bus), or the like, which connects to an external device. The storage section 35 stores information input from the input section 36. Thereby, it is possible to rewrite information, such as the transmission waveform information, the specification of the optical transmission channel, and the like, which are stored in the storage section 35.

In the case of optical transmission, as a conventional method for compensating for wavelength dispersion, there is a method of inserting a dispersion compensation optical part (a dispersion compensation optical fiber, etc.) having wavelength dispersion characteristics inverse to those of the optical transmission channel. In general, however, the wavelength dispersion amount of the optical part often has a fixed value. Therefore, in the case where this method is used, if an installation condition, such as the transmission distance or the like, varies, it is necessary to optimally design the dispersion compensation optical part separately. In contrast to this, in the configuration of FIG. 7, by using the input section 36, when the pulse signal demodulation device 30c is installed, the transmission waveform information and the specification of the optical transmission channel which are appropriate for each use condition, can be input. In other words, only the specification of the optical transmission channel to be input is changed and other parts do not have to be changed, thereby making it possible to use the same configuration to support different installation conditions. In addition, even if the characteristics of the optical transmission channel (a semiconductor laser, etc.) change due to deterioration over time or the like after start of an operation, it is possible to input an appropriate specification of the optical transmission channel again.

As described above, since the pulse signal demodulation device further comprises the storage section and the input section, an effect similar to that of the first embodiment can be obtained, and more flexible operations can be performed, corresponding to different use conditions.

Third Embodiment

Figure 8:
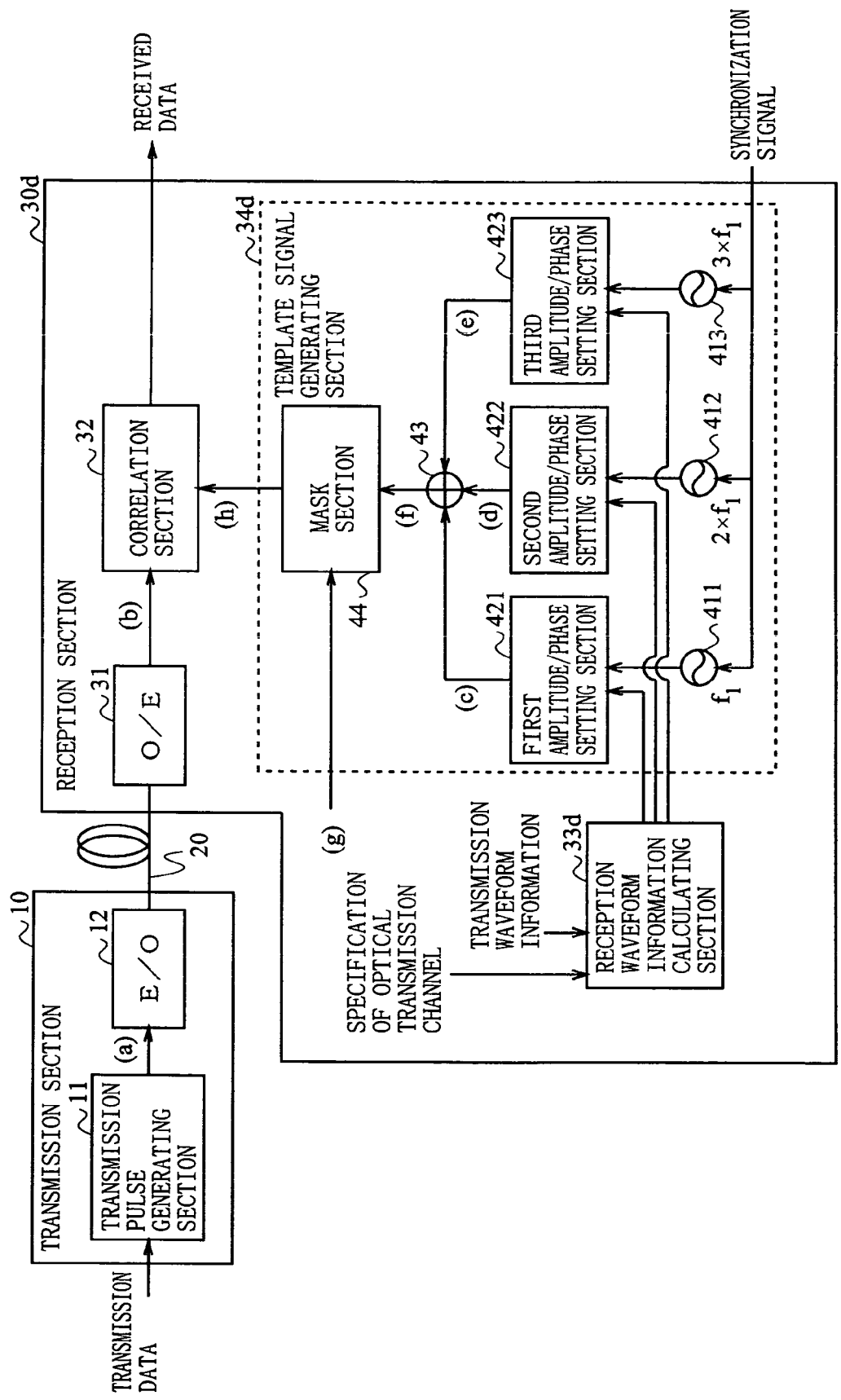
FIG. 8 is a block diagram illustrating a configuration of an optical transmission system to which a pulse signal demodulation device 30d according to a third embodiment of the present invention is applied.

FIG. 8 is a diagram illustrating a configuration of an optical transmission system to which a pulse signal demodulation device 30d according to a third embodiment of the present invention is applied. The optical transmission system of FIG. 8 includes a transmission device 10 and the pulse signal demodulation device 30d. The transmission device 10 and the pulse signal demodulation device 30d are connected via an optical transmission channel 20.

In FIG. 8, the pulse signal demodulation device 30d of this embodiment includes an optical-to-electrical conversion section 31, a correlation section 32, a reception waveform information calculating section 33d, and a template signal generating section 34d. The template signal generating section 34d included in the pulse signal demodulation device 30d of this embodiment has a specific exemplary configuration of the template signal generating section 34 of the first embodiment. In FIG. 8, components similar to those of FIG. 1 are indicated with the same reference numerals and will not be described. The functions of a transmission pulse generating section 11 and an electrical-to-optical conversion section 12 are similar to those of the first embodiment and will not be described. Note that (a) to (h) illustrated in FIG. 8 indicate that signals indicated with (a) to (h) of FIG. 9 (described below) are output in directions indicated with arrows.

The template signal generating section 34d has a plurality of sine wave generating sections 411 to 413, a plurality of amplitude/phase setting sections 421 to 423, a wave combining section 43, and a mask section 44.

The reception waveform information calculating section 33d generates reception waveform information based on the specification of the optical transmission channel and the transmission waveform information which are input from an input section (not shown). In this embodiment, the reception waveform information calculating section 33d calculates the reception waveform information in a manner basically similar to that of the first embodiment, but different from that of the first embodiment in that the reception waveform information calculating section 33d handles only a peak frequency component of a calculated spectrum of a received signal, and frequency components having integral multiples of the peak frequency component. The reception waveform information calculating section 33d outputs amplitudes and phases of a component having a peak frequency $f_1$ in the calculated received signal spectrum and frequency components having integral multiples of the peak frequency $f_1$, as reception waveform information, to the first to third amplitude/phase setting sections 421 to 423.

Figure 9:
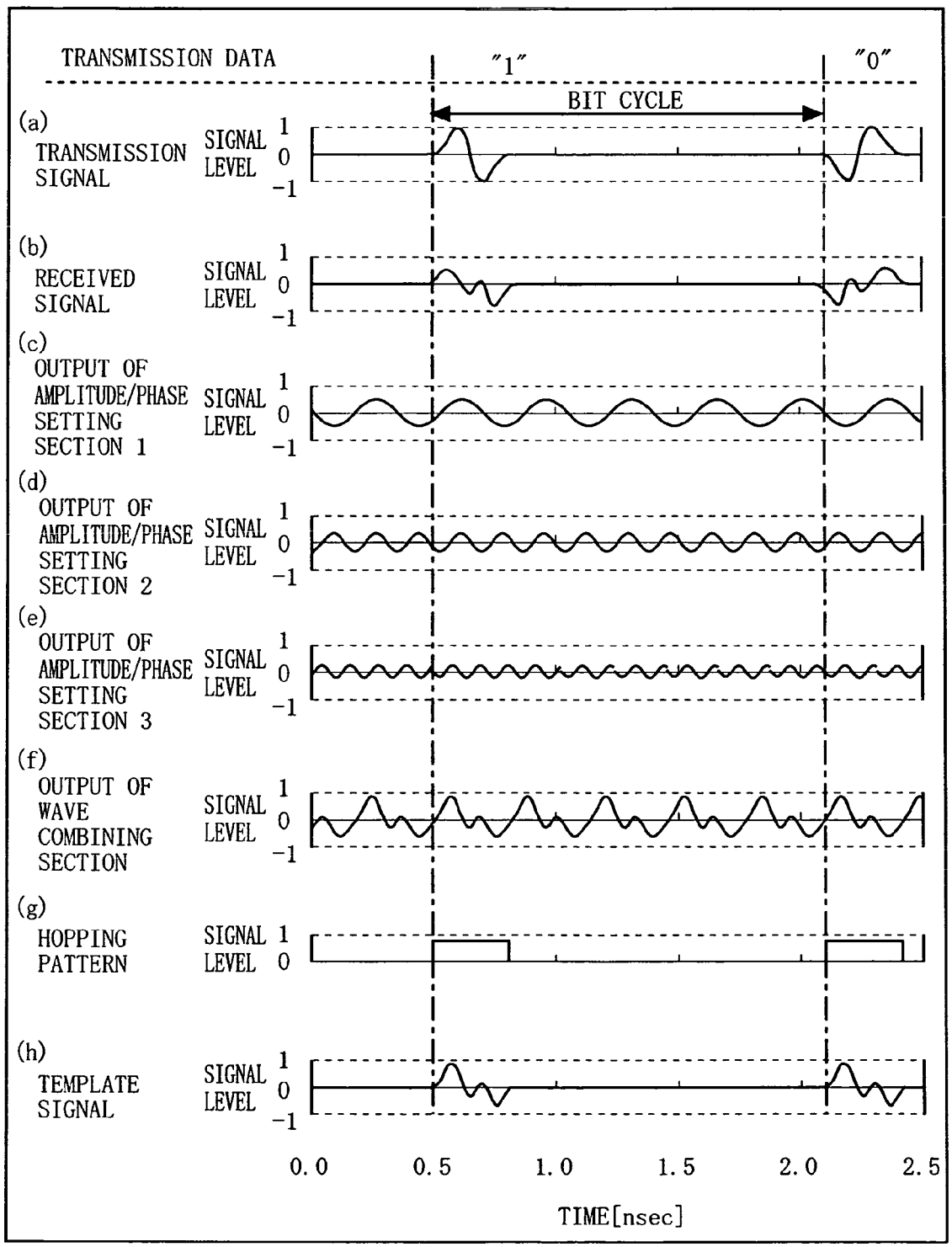
FIG. 9 is a diagram illustrating exemplary waveforms of signals output from major sections of the pulse signal demodulation device 30d of FIG. 8, which are results obtained by simulation.

FIG. 9 is a diagram illustrating exemplary waveforms of signals output from major sections of the optical transmission system of FIG. 8, which are obtained by simulation. Note that the calculation conditions are assumed as follows: a wavelength of an optical signal is 1.55 μm; a chirp parameter of the electrical-to-optical conversion section 12 is 2.5; and optical transmission is performed over a distance of 40 km through a single mode optical fiber. Hereinafter, a function of each section will be described with reference to FIGS. 8 and 9.

FIG. 9(a) is a diagram illustrating a pulse of a transmission signal output from the transmission pulse generating section 11. FIG. 9(b) is a waveform of a received signal output from the optical-to-electrical conversion section 31. A distortion occurs in the transmission signal of FIG. 9(a) during the time when the transmission signal is converted into an optical signal by the electrical-to-optical conversion section 12, and the transmission signal is transmitted through the optical transmission channel 20, as illustrated in FIG. 9(b).

The sine wave generating sections 411 to 413 of FIG. 8 generate and output sine waves of the peak frequency $f_1$ and integral multiples of the peak frequency $f_1$ to the first to third amplitude/phase setting sections 421 to 423, respectively. Here, the case where the sine wave generating sections 411 to 413 generate the peak frequency $f_1$ and the double and triple frequencies, will be described as an example. The sine waves generated by the sine wave generating sections 411 to 413 are each synchronized with a synchronization signal. As in the first embodiment, the synchronization signal needs to be in synchronization with a received signal, and the generating means is not particularly limited.

FIG. 9(c) is a diagram illustrating a waveform of a signal generated by the first amplitude/phase setting section 421. The sine wave generating section 411 generates and outputs a sine wave having the peak frequency $f_1$ of the transmission signal of FIG. 9(a) to the first amplitude/phase setting section 421. The first amplitude/phase setting section 421 adjusts an amplitude and a phase of the sine wave of the frequency $f_1$ output from the sine wave generating section 411, based on the reception waveform information output from the reception waveform information calculating section 33d.

Specifically, the first amplitude/phase setting section 421 sets the values of the amplitude and phase of the frequency $f_1$ output from the sine wave generating section 411 to be equal to the values of the amplitude and phase of the frequency $f_1$ output as the reception waveform information from the reception waveform information calculating section 33d.

FIG. 9(d) is a diagram illustrating a waveform of a signal output by the second amplitude/phase setting section 422. The sine wave generating section 412 generates and outputs a sine wave having a frequency double the peak frequency $f_1$ of the transmission signal of FIG. 9(a) to the second amplitude/phase setting section 422. The second amplitude/phase setting section 422 sets the values of the amplitude and phase of the frequency $2 \times f_1$ output from the sine wave generating section 412 to be equal to the values of the amplitude and phase of the frequency $2 \times f_1$ output as the reception waveform information from the reception waveform information calculating section 33d.

FIG. 9(e) is a diagram illustrating a waveform of a signal output by the third amplitude/phase setting section 423. The sine wave generating section 413 generates and outputs a sine wave having a frequency three triple the peak frequency $f_1$ of the transmission signal of FIG. 9(a) to the third amplitude/phase setting section 423. The third amplitude/phase setting section 423 sets the values of the amplitude and phase of the frequency $3 \times f_1$ output from the sine wave generating section 413 to be equal to the values of the amplitude and phase of the frequency $3 \times_1$ output as the reception waveform information from the reception waveform information calculating section 33d.

Thereafter, the amplitude/phase setting sections 421 to 423 output the sine wave signals whose amplitude and phase have been adjusted, to the wave combining section 43.

The wave combining section 43 combines the sine wave signals output from the amplitude/phase setting sections 421 to 423 and outputs the combined wave to the mask section 44. FIG. 9(f) is a diagram illustrating a waveform of the signal output by the wave combining section 43. As illustrated in FIG. 9(f), the signal output by the wave combining section 43 is a signal which has a series of waveforms each similar to the received signal of FIG. 9(b).

The mask section 44 adjusts timing of a pulse in the signal output from the wave combining section 43, and outputs the resultant signal as a template signal to the correlation section 32. Specifically, the mask section 44 generates the template signal based on a hopping pattern indicating timings with which pulses are present, and the signal output from the wave combining section 43.

FIG. 9(g) is a diagram illustrating a waveform of the hopping pattern input to the mask section 44. Thus, the hopping pattern has a waveform which goes to "1" with timing where there is a pulse, and goes to "0" with timing where there is not a pulse.

The mask section 44 passes the signal received from the wave combining section 43 when the hopping pattern is "1", and does not pass the signal received from the wave combining section 43 when the hopping pattern is "0". FIG. 9(h) is a diagram illustrating a waveform of the template signal output by the mask section 44. As illustrated in FIG. 9(h), the template signal output from the mask section has the same pattern as that of the hopping pattern. The mask section 44 outputs the generated template signal to the correlation section 32. Thus, the template signal close to the waveform of the received signal can be obtained.

As described above, according to this embodiment, the pulse signal demodulation device generates a template signal using a peak frequency of a transmission signal spectrum and integral multiple components thereof. For example, when any arbitrary waveform generator is used to generate the template signal, a sampling rate which is at least about several times higher than frequency components contained in the template signal is required. However, according to this embodiment, frequencies which are used to generate the template signal are only a peak frequency and integral multiple frequency components thereof of a transmission signal spectrum. Therefore, parts for a relatively low rate can be used as compared to when any arbitrary waveform generator is used.

Also, according to this embodiment, as compared to when the template signal generating section is composed of any arbitrary waveform generator, a time required to generate the template signal can be reduced. Therefore, when a transmission signal having a small pulse width is demodulated, i.e., a transmission rate is increased, this embodiment is particularly effective.

Note that, when transmission devices and pulse signal demodulation devices are connected in one-to-one correspondence, but not in multiple connection, a received signal only needs to be detected, and therefore, a signal output from the wave combining section 43 can be directly used as a template signal. Therefore, in this case, the mask section 44 can be removed from the pulse signal demodulation device.

Also, according to this embodiment, the case where the peak frequency $f_1$ of the waveform of a transmission signal and the double and triple frequencies thereof are used, has been described. It may be determined as appropriate how many times higher than the peak frequency $f_1$ a highest frequency component used is, depending on the specifications of the transmission device and the transmission channel.

Fourth Embodiment

Figure 10:
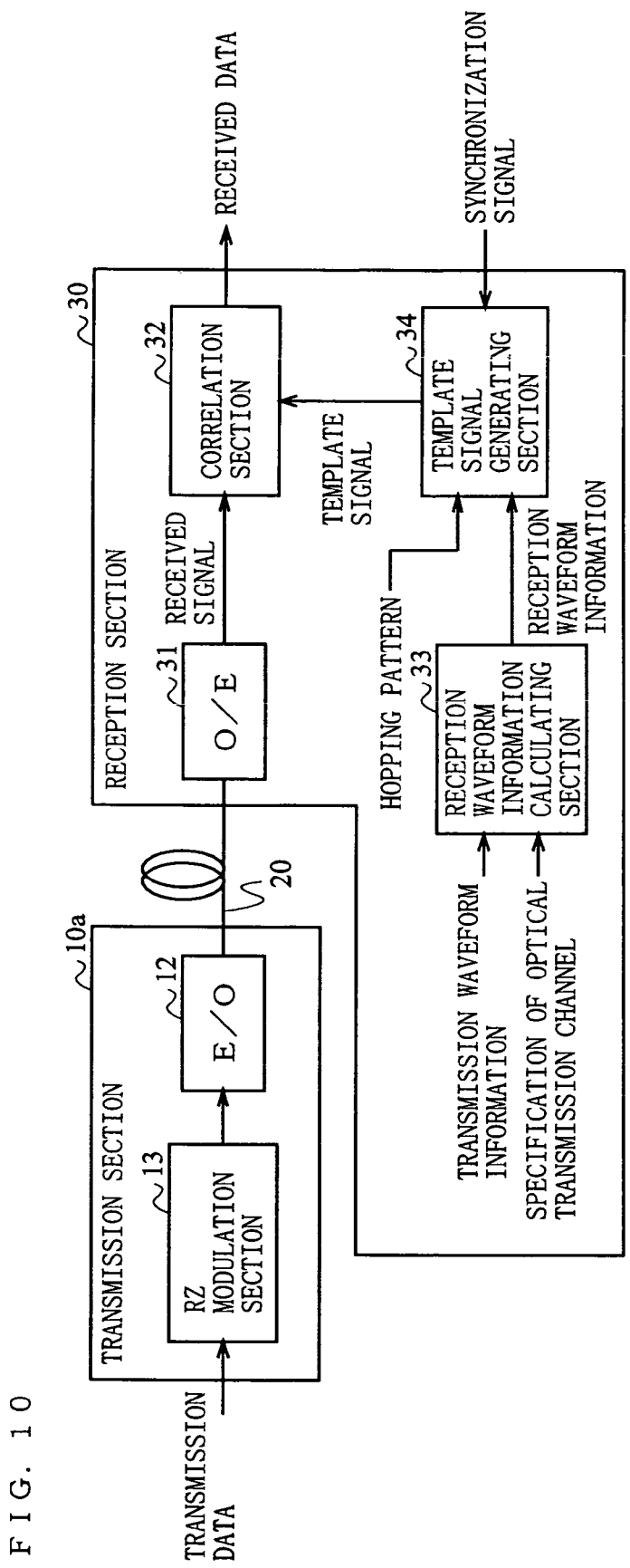
FIG. 10 is a block diagram illustrating a configuration of an optical transmission system to which a pulse signal demodulation device 30 according to a fourth embodiment of the present invention is applied.

FIG. 10 is a block diagram illustrating a configuration of an optical transmission system to which a pulse signal demodulation device 30 according to a fourth embodiment of the present invention is applied. The optical transmission system of FIG. 10 includes a transmission device 10a and a pulse signal demodulation device 30. The transmission device 10a and the pulse signal demodulation device 30 are connected via an optical transmission channel 20.

The transmission device 10a includes an RZ modulation section 13 and an electrical-to-optical conversion section 12. The pulse signal demodulation device 30 includes an optical-to-electrical conversion section 31, a correlation section 32, a reception waveform information calculating section 33, and a template signal generating section 34.

The optical transmission system of FIG. 10 is different from the optical transmission system of FIG. 1 in that the RZ modulation section 13 which generates an RZ (Return to Zero) signal is included in the transmission device 10 instead of the transmission pulse generating section 11. The other components are similar to those of the first embodiment, and therefore, components similar to those of FIG. 1 are indicated with the same reference numerals and will not be described.

The RZ modulation section 13 converts transmission data into an RZ signal, and outputs the RZ signal as a transmission signal to the electrical-to-optical conversion section 12.

In the reception waveform information calculating section 33, input transmission waveform information is information which indicates a pulse waveform of the RZ signal output from the RZ modulation section 13.

The correlation section 32 demodulates the RZ signal into received data based on a template signal output from the template signal generating section 34 and a received signal output from the optical-to-electrical conversion section 31.

As described above, according to this embodiment, in the case where the RZ signal is converted into an optical signal before transmission, even when a distortion occurs in the waveform of the RZ signal, the RZ signal can be correctly demodulated.

Variation of Fourth Embodiment

Figure 11:
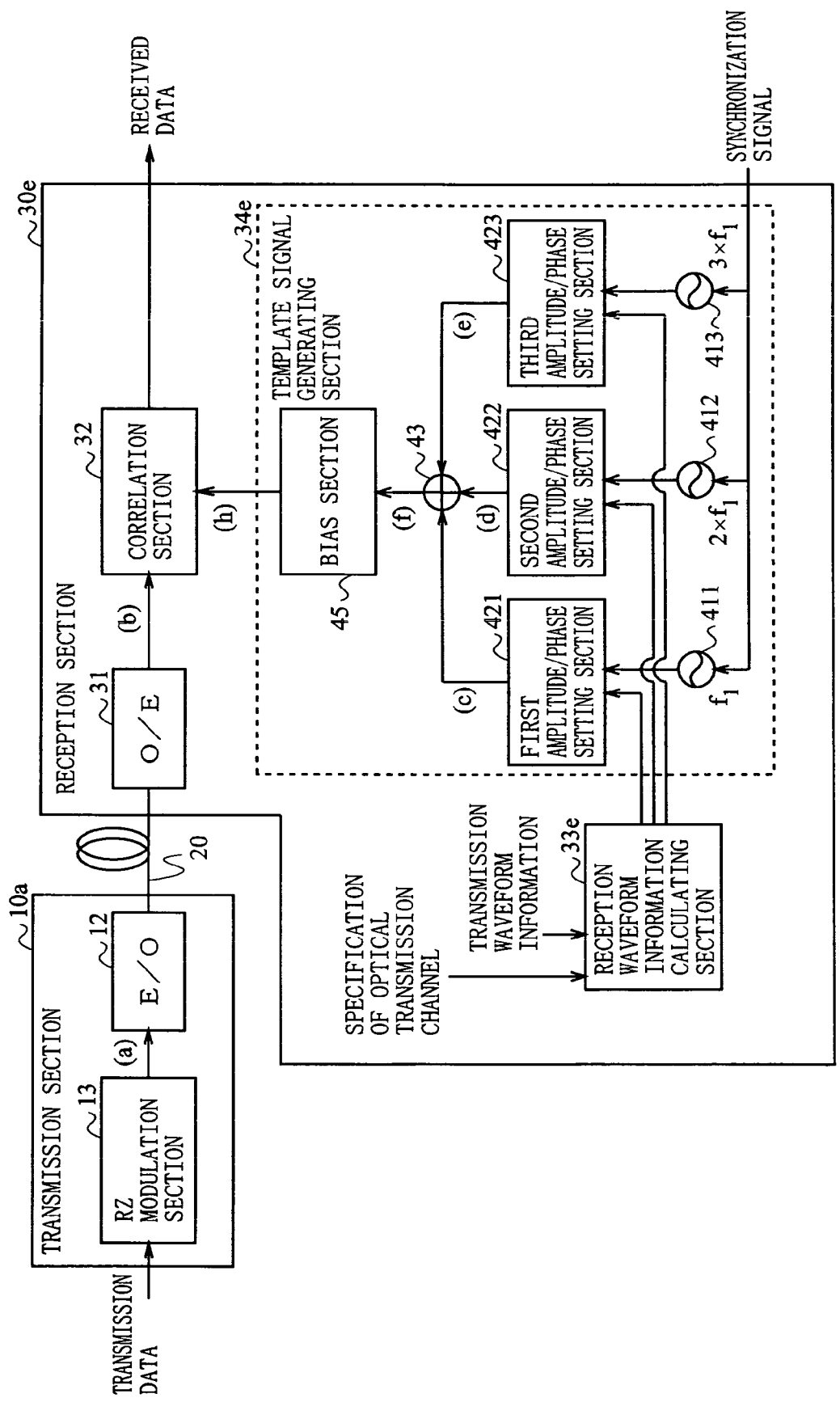
FIG. 11 is a block diagram illustrating a configuration of an optical transmission system to which a pulse signal demodulation device 30e of a variation of the fourth embodiment is applied.

Next, a variation of the fourth embodiment will be described. FIG. 11 is a block diagram illustrating a configuration of an optical transmission system to which a pulse signal demodulation device 30e of this variation is applied. The optical transmission system of FIG. 11 includes a transmission device 10a and the pulse signal demodulation device 30e. The transmission device 10a and the pulse signal demodulation device 30e are connected via an optical transmission channel 20.

The transmission device 10a includes an RZ modulation section 13 and an electrical-to-optical conversion section 12. The pulse signal demodulation device 30e includes an optical-to-electrical conversion section 31, a correlation section 32, a reception waveform information calculating section 33e, and a template signal generating section 34e. The template signal generating section 34e has a plurality of sine wave generating sections 411 to 413, a plurality of amplitude/phase setting sections 421 to 423, a wave combining section 43, and a bias section 45.

The configuration of the transmission device 10a of FIG. 11 is similar to that of the transmission device 10a of FIG. 10 and will not be described. The configuration of the pulse signal demodulation device 30e of FIG. 11 is different from the pulse signal demodulation device 30d of the third embodiment of FIG. 8 in that the template signal generating section 34e has the bias section 45 instead of the mask section 44. The other components are similar to those of the third embodiment, and therefore, components similar to those of FIG. 8 are indicated with the same reference numerals and will not be described. Also, the reception waveform information calculating section 33e of this embodiment corresponds to the reception waveform information calculating section 33d of the third embodiment of FIG. 8. Note that (a) to (h) illustrated in FIG. 11 indicate that signals indicated with (a) to (h) of FIG. 12 (described below) are output in directions indicated with arrows.

Figure 12:
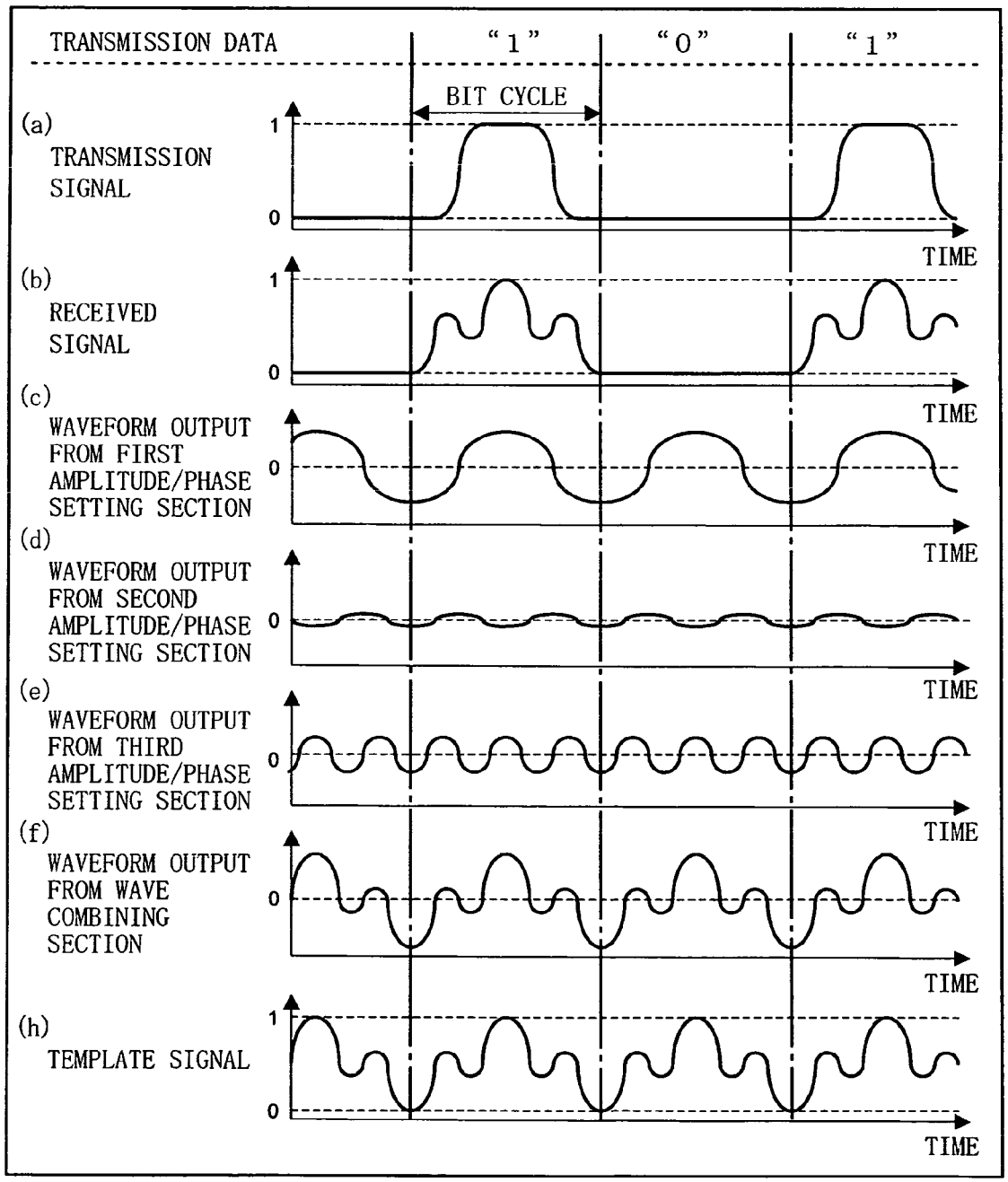
FIG. 12 is a diagram illustrating waveforms of signals output from major sections of the pulse signal demodulation device 30e of FIG. 11.

FIG. 12 is a diagram illustrating waveforms of signals output from major sections of the optical transmission system of FIG. 11. Hereinafter, a function of each section will be described with reference to FIGS. 11 and 12.

FIG. 12(a) is diagram illustrating a waveform of a transmission signal output from the RZ modulation section 13. As illustrated in FIG. 12(a), the transmission signal is an RZ signal. When there is a pulse, data "1" is output from the RZ modulation section 13. When there is not a pulse, data "0" is output from the RZ modulation section 13.

FIG. 12(b) is a waveform of a received signal output from the optical-to-electrical conversion section 31. A distortion occurs in the transmission signal of FIG. 12(a) during the time when the transmission signal is converted into an optical signal by the electrical-to-optical conversion section 12 and the transmission signal is transmitted through the optical transmission channel 20, as illustrated in FIG. 12(b).

FIG. 12(c) is a diagram illustrating a waveform of a signal output from the first amplitude/phase setting section 421. FIG. 12(d) is a diagram illustrating a waveform of a signal output from the second amplitude/phase setting section 422. FIG. 12(e) is a diagram illustrating a waveform of a signal output from the third amplitude/phase setting section 423. The functions of the sine wave generating sections 411 to 413, the amplitude/phase setting sections 421 to 423 and the wave combining section 43 are similar to those of the third embodiment and will not be described.

FIG. 12(f) is a diagram illustrating a waveform of a signal output from the wave combining section 43. The wave combining section 43 combines the sine wave signals output from the amplitude/phase setting sections 421 to 423, and outputs the combined signals to the bias section 45. As illustrated in FIG. 12(f), the signal output from the wave combining section 43 has a waveform similar to that of the received signal, and has an average level of "0". On the other hand, since the received signal is an RZ signal, the minimum value is "0".

The bias section 45 adds a bias to the signal output from the wave combining section 43 so that the minimum value of the signal is "0", and outputs the resultant signal as a template signal to the correlation section 32.

The correlation section 32 obtains a correlation value and demodulates the received signal, based on the template signal output from the bias section 45 and the received signal output from the optical-to-electrical conversion section 31.

Thus, by adding a bias to the signal output from the wave combining section 43 so that the minimum value of the signal is "0", a received signal waveform of an RZ signal in which a distortion occurs can be reproduced. By using this as a template signal, it is possible to suppress deterioration of a correlation value due to a waveform distortion to improve reception performance.

As described above, according to this embodiment, in an optical transmission system in which an RZ signal is converted into an optical signal before transmission, a pulse signal demodulation device can generate a template signal on which a distortion occurring in an optical signal is reflected. Therefore, an RZ signal can be correctly demodulated.

Also, in the third and fourth embodiments, the reception waveform information calculating section generates the reception waveform information based on the input transmission waveform information and the input specification of the optical transmission channel. Here, as in the first embodiment, the reception waveform information calculating section may previously store the specification of the optical transmission channel and the transmission waveform information, or alternatively, may obtain the specification of the optical transmission channel by monitoring the optical transmission channel. Also, as in the variation of the first embodiment, when the specification of the optical transmission channel is not clear, the reception waveform information may be changed to determine the specification of the optical transmission channel so that the correlation value is maximized.

Fifth Embodiment

Figure 13:
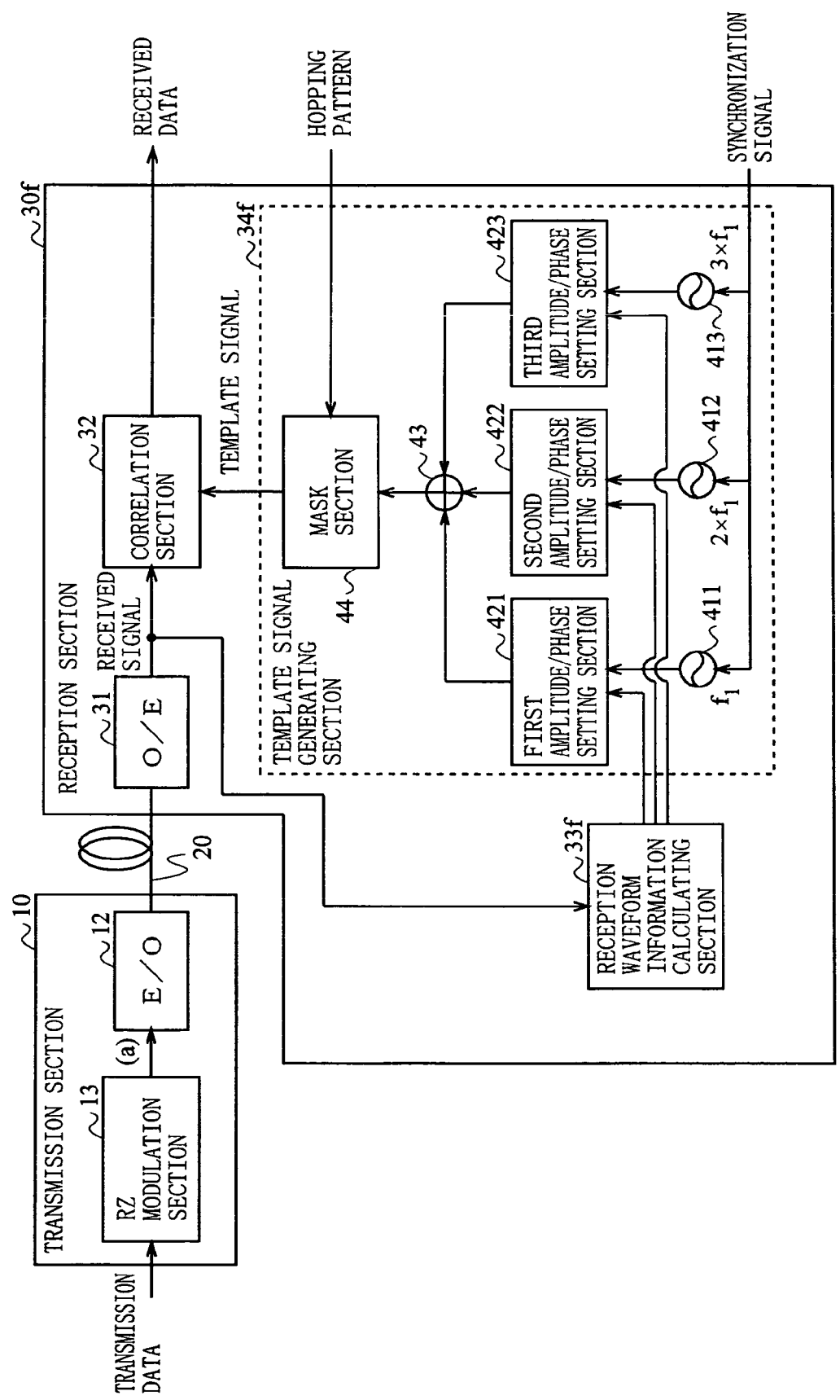
FIG. 13 is a block diagram illustrating a configuration of an optical transmission system to which a pulse signal demodulation device 30f according to a fifth embodiment of the present invention is applied.
Figure 14:
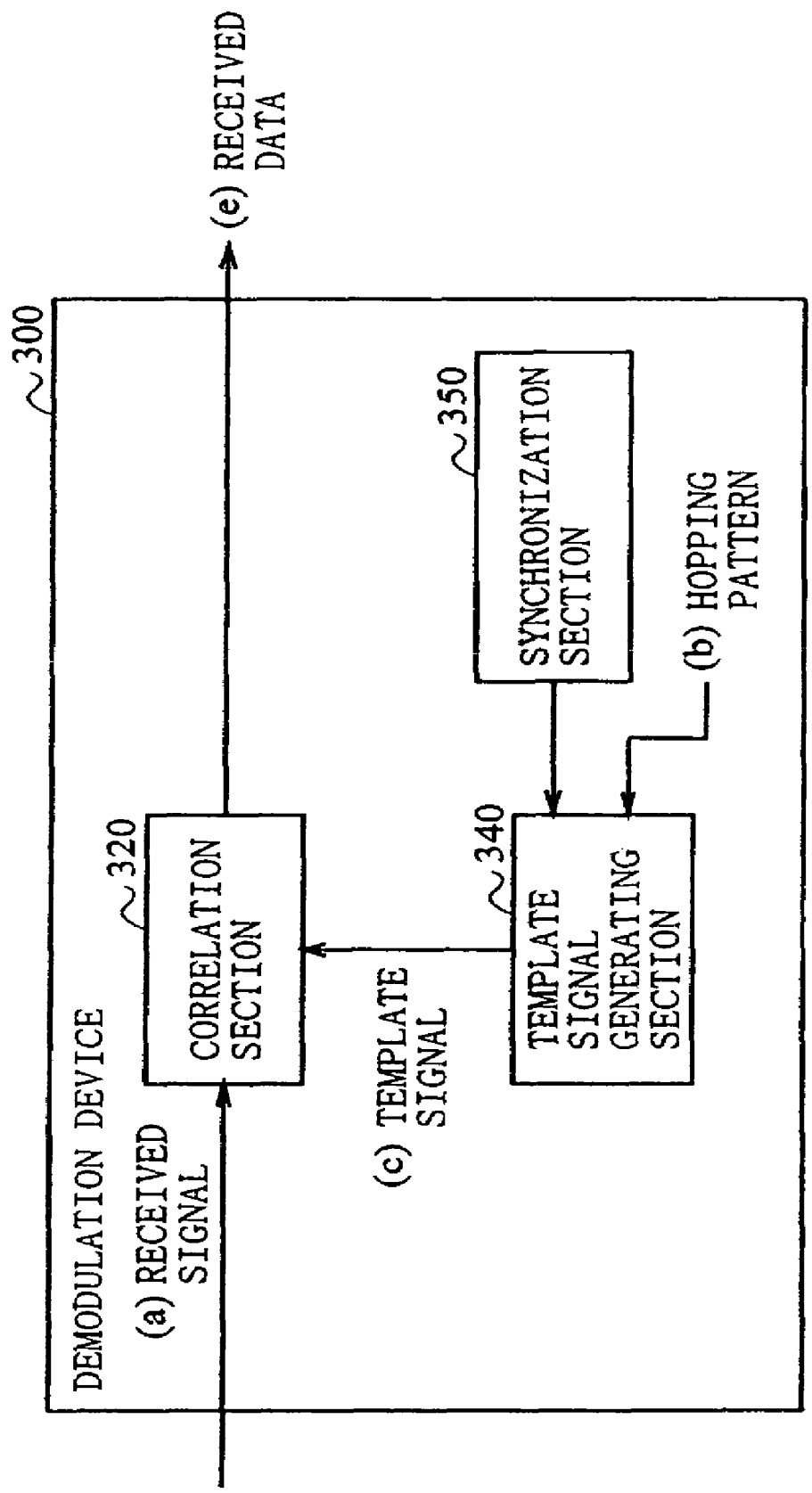
FIG. 14 is a block diagram illustrating a configuration of a conventional demodulation device used in an ultra-wide band communication scheme.
Figure 15:
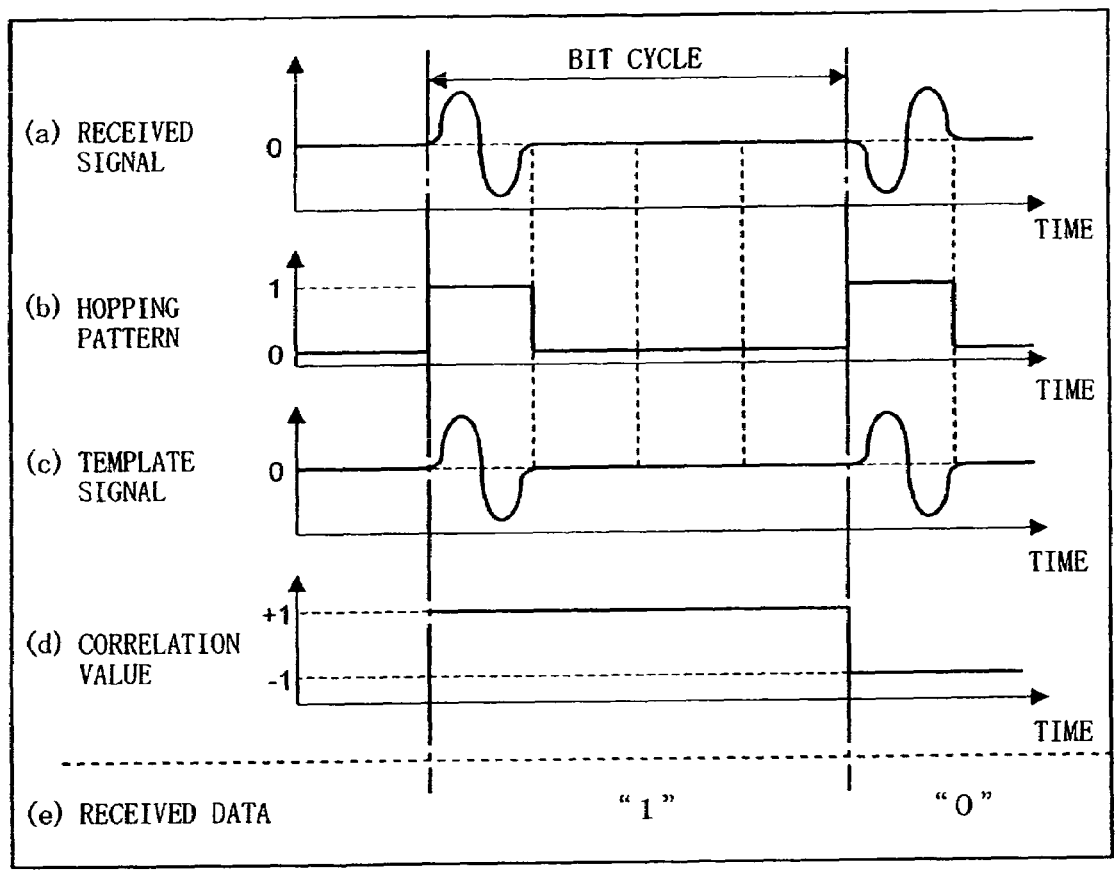
FIG. 15 is a diagram illustrating waveforms of signals output from major sections of the conventional demodulation device of FIG. 14.

FIG. 13 is a block diagram illustrating a configuration of an optical transmission system to which a pulse signal demodulation device 30*f* according to a fifth embodiment of the present invention is applied. The optical transmission system of FIG. 13 includes a transmission device 10 and the pulse signal demodulation device 30*f*. The transmission device 10 and the pulse signal demodulation device 30*f* are connected via an optical transmission channel 20.

In FIG. 13, the pulse signal demodulation device 30*f* of this embodiment includes an optical-to-electrical conversion section 31, a correlation section 32, a reception waveform information calculating section 33*f*, and a template signal generating section 34*f*. The template signal generating section 34*f* includes sine wave generating sections 411 to 413, a plurality of amplitude/phase setting sections 421 to 423, a wave combining section 43, and a mask section 44.

The pulse signal demodulation device 30*f* of this embodiment is different from the pulse signal demodulation device 30*d* of the third embodiment of FIG. 8 in a method of calculating reception waveform information in the reception waveform information calculating section 33*f*. The other components are similar to those of the third embodiment, and therefore, components similar to those of FIG. 8 are indicated with the same reference numerals and will not be described. The functions of the RZ modulation section 13 and the electrical-to-optical conversion section 12 are similar to those of the fourth embodiment and will not be described.

In this embodiment, the transmission device 10 converts a test signal corresponding to a code "1" into an optical signal and outputs the optical signal to the optical transmission channel 20 before actually transmitting transmission data.

In the pulse signal demodulation device 30*f*, the electrical signal converted by the optical-to-electrical conversion section 31 is split and input to the reception waveform information calculating section 33*f*.

The reception waveform information calculating section 33*f* generates reception waveform information based on the test received signal output from the optical-to-electrical conversion section 31. Specifically, the reception waveform information calculating section 33*f* extracts a component having a peak frequency $f_1$ and components having integral multiple frequencies thereof of a transmission signal spectrum from a waveform of the test electrical signal, and outputs amplitudes and phases thereof to the first to third amplitude/phase setting sections 421 to 423 of the template signal generating section 34*f*.

Note that the operation of the template signal generating section 34*f* is similar to that of the template signal generating section 34*d* of the third embodiment and will not be described.

As described above, according to this embodiment, the pulse signal demodulation device generates a template signal based on a waveform of an actually received signal. Thereby, it is possible to easily generate a template signal having a waveform close to that of a received waveform. In addition, for example, when a complicated calculation is required to calculate a deterioration in waveform in an optical transmission channel (e.g., when a distortion occurs in a signal waveform due to a plurality of waveform deteriorating factors), this embodiment is particularly effective.

Note that, in this embodiment, the case where the peak frequency $f_1$ and the double and triple frequencies thereof of a received signal in the spectrum of the received signal are used, has been described. Here, as in the third embodiment, it may be determined as appropriate how many times higher than the peak frequency $f_1$ a frequency component used is, depending on the specifications of the transmission device and the transmission channel.

INDUSTRIAL APPLICABILITY

The present invention is useful as a pulse signal demodulation device or the like which correctly demodulates a pulse signal in an optical transmission system in which a pulse signal is converted into an optical signal before transmission. The present invention is also useful as a demodulation circuit for communication devices.

The invention claimed is:

1. A pulse signal demodulation device for receiving a pulse signal converted into an optical signal via an optical transmission channel, and demodulating the pulse signal, comprising:

an optical-to-electrical conversion section for converting the received optical signal into an electrical signal, and outputting the electrical signal as a received signal;

a reception waveform information calculating section for outputting, as reception waveform information, information about a shape of a waveform of the pulse signal on which a distortion occurring during the time from when the pulse signal is converted to the optical signal to when the optical signal is converted into the received signal by the optical-to-electrical conversion section, is reflected;

a template signal generating section for generating a template signal which has a waveform on which a distortion similar to the distortion occurring in the received signal is reflected, and is in synchronization with the received signal, based on the reception waveform information output from the reception waveform information calculating section and a synchronization signal which is in synchronization with the received signal; and a correlation section for demodulating the pulse signal by obtaining a correlation between waveforms of the received signal output from the optical-to-electrical conversion section and the template signal generated by the template signal generating section, wherein the reception waveform information calculating section outputs, as reception waveform information, amplitudes and phases of a frequency component corresponding to an integral multiple of a peak frequency of a spectrum of the pulse signal, and the peak frequency component, in the distortion occurring in the pulse signal, and the template signal generating section includes:
  a plurality of sine wave generating sections for generating a sine wave signal having the peak frequency and a sine wave signal having a frequency which is an integral multiple of the peak frequency;
  a plurality of amplitude/phase adjusting sections for adjusting amplitudes and phases of the sine wave signals generated by the plurality of sine wave generating sections, based on the reception waveform information; and
  a wave combining section for combining the sine wave signals having the amplitudes and the phases adjusted by the plurality of amplitude/phase adjusting sections.

2. The pulse signal demodulation device according to claim 1, where the template signal generating section further includes a mask section for passing the combined signal obtained by the wave combining section, based a hopping pattern indicating timing of a pulse to be received, to generate the template signal.

3. The pulse signal demodulation device according to claim 1, wherein the pulse signal is an RZ signal, and
  the template signal generating section further includes:
    a bias section for adding a bias to the combined sine wave signal obtained by the wave combining section so that a minimum value of the combined sine wave signal is "0", and outputting the resultant signal as a template signal.

4. The pulse signal demodulation device according to claim 1, wherein the reception waveform information calculating section generates the reception waveform information based on a waveform of the pulse signal as it is transmitted, and information about the optical transmission channel,
  the information about the optical transmission channel includes a chirp parameter of a semiconductor laser or an optical modulator used as a transmitter for transmitting the optical signal, and a total dispersion amount of the optical transmission channel in a wavelength of the optical signal, and
  the reception waveform information calculating section calculates a transmitted light spectrum based on a waveform of the pulse signal as it is transmitted, and a chirp parameter, calculates a received light spectrum based on the transmitted light spectrum and the total dispersion amount of the optical transmission channel, calculates a received signal spectrum converted into an electrical signal based on the received light spectrum, and outputs information about the received signal spectrum as reception waveform information.

5. The pulse signal demodulation device according to claim 1, wherein the reception waveform information calculating section generates the reception waveform information based on a waveform of the pulse signal as it is transmitted, and information about the optical transmission channel,
  the device further comprising:
  a storage section for storing a waveform of the pulse signal as it is transmitted, and the information about the optical transmission channel.

6. The pulse signal demodulation device according to claim 5, further comprising:
  an input section for inputting the waveform of the pulse signal as it is transmitted, and the information about the optical transmission channel,
  wherein the storage section stores the waveform of the pulse signal as it is transmitted, and the information about the optical transmission channel which are input from the input section.

* * * * *